United States Patent
Ellis et al.

(10) Patent No.: US 9,449,329 B2
(45) Date of Patent: Sep. 20, 2016

(54) ENTERPRISE ARCHITECTURE SYSTEM AND METHOD

(71) Applicant: Credit Suisse Securities (USA) LLC, New York, NY (US)

(72) Inventors: Robert David Ellis, New York, NY (US); Erem Mustafa Tanyeri, Syosset, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 209 days.

(21) Appl. No.: 14/517,327

(22) Filed: Oct. 17, 2014

(65) Prior Publication Data

US 2015/0039396 A1   Feb. 5, 2015

Related U.S. Application Data

(63) Continuation of application No. 13/705,156, filed on Dec. 4, 2012, now Pat. No. 8,903,815, which is a continuation of application No. 12/196,899, filed on Aug. 22, 2008, now Pat. No. 8,326,873.

(60) Provisional application No. 61/020,052, filed on Jan. 9, 2008.

(51) Int. Cl.
  *G06Q 30/02*  (2012.01)
  *G06F 17/30*  (2006.01)
  *G06Q 20/08*  (2012.01)

(52) U.S. Cl.
  CPC ........... *G06Q 30/0206* (2013.01); *G06F 17/30* (2013.01); *G06F 17/30424* (2013.01); *G06Q 20/085* (2013.01)

(58) Field of Classification Search
  USPC ........................ 707/E17.014, 999.003, 688
  See application file for complete search history.

(56) References Cited

U.S. PATENT DOCUMENTS

| | | | | |
|---|---|---|---|---|
| 7,743,001 B1* | 6/2010 | Vermeulen | ......... | G06Q 30/0283 705/400 |
| 7,853,643 B1* | 12/2010 | Martinez | ................. | H04L 29/06 709/201 |
| 8,069,140 B2* | 11/2011 | Enenkiel | ........... | H04L 29/12009 707/610 |
| 8,275,855 B2* | 9/2012 | Kothari | ............... | H04L 12/2602 709/218 |
| 8,326,873 B2* | 12/2012 | Ellis | ................... | G06F 17/30424 707/783 |
| 8,903,815 B2* | 12/2014 | Ellis | ................... | G06F 17/30424 707/707 |
| 2002/0173317 A1* | 11/2002 | Nykanen | ................. | H04W 4/02 455/456.1 |
| 2007/0233690 A1* | 10/2007 | Bruchlos | ................. | G06Q 30/02 |
| 2009/0164621 A1* | 6/2009 | Kothari | ............... | H04L 12/2602 709/224 |

* cited by examiner

*Primary Examiner* — Debbie Le
(74) *Attorney, Agent, or Firm* — Chadbourne & Parke LLP; Kenneth L. Johnson

(57) ABSTRACT

A method for costing a web service operable for querying one or more data sources, the method including calculating the cost of operating the web service, measuring web service usage data using one or more service metrics, wherein the one or more service metrics include at least one derived service metric, choosing at least one service metric from the one or more service metrics, wherein one or more of the at least one chosen service metrics is a derived service metric, calculating the cost of the web service based on the at least one chosen service metric, and charging for usage of the web service based upon the calculated cost of the web service.

8 Claims, 27 Drawing Sheets

ENTERPRISE ARCHITECTURE SYSTEM AND METHOD

PRIORITY CLAIM

This application is a continuation of U.S. patent application Ser. No. 13/705,156, filed on Dec. 4, 2012, which is a divisional of U.S. Pat. No. 8,326,873, filed Aug. 22, 2008, which in turn claims priority to U.S. Provisional Patent Application No. 61/020,052, filed on Jan. 9, 2008; the contents of each of these applications is incorporated by reference herein in its entirety.

BACKGROUND OF THE INVENTION

Information is the life blood of many enterprises. An enterprise will likely have many different data sources which contribute to the execution of its business and management of the environment in which business is conducted. Analysts have identified the term Knowledge Worker to mean staff employed by an enterprise to retrieve and analyze information pursuant to reporting on a current state of a situation or some other requirement. To execute their function effectively, the Knowledge Worker may require timely and effective access to complete information—often across multiple data sources. Server applications may require remote information in order to execute a process. Server applications may need even more timely information than a human. In addition, server applications may need information that is syntactically and semantically correct.

One way of achieving such a solution is to build a single database containing all the information required to solve a problem and combining it with a client application which supports querying the database for the included information. This solution may be adequate for solving closed problems, such as a systems monitoring solution or a configuration management database (CMDB). However, building a single database may have at least two significant limitations: (1) the data provider may become responsible for the content in the database, which may include keeping the data current, clean and complete; and (2) the scope of the data is limited to the database's schema, meaning that without life-cycling the schema, portions of the data can become out of date, irrelevant, or insufficient to answer to problem at hand.

Although a single database may be adequate in many circumstances, it may pose practical hurdles if several databases are created; for example, one database for IT, one database for financial control, one database for sales, etc. If an enterprise has many such databases, relationships can be dispersed across each of the databases and these databases could also include duplicate content and/or duplicate attributes.

Solutions which bridge multiple data sources may have to solve the problem of content and attribute collision in order to identify multi-source relationships. However, open problems may need open data. An example of an open problem is a search performed on the Internet for a desired topic.

The invention presented may be employed to solve the problems inherent in exposing content within and the relationships between large corporate data repositories in a timely cross-platform manner. The invention can also provide solutions to operating consumer internet services in an enterprise context—namely, how to manage authorization through Representational State Transfer (REST) web services and also how to wrap a service management framework around the same services so that consumers can be charged for using such services. REST web services may provide advantages such as simplifying the process of querying and obtaining data sources, but conventionally can also limit solutions to enterprise requirements.

The consumer internet has seen a significant rise in the evolution of web services and mash-ups in recent years. Social and search applications are two of many examples of this rise. Ajax is a programming style that many such web services use to retrieve, process, and render data. Many enterprises and vendors have been working on adopting these functionalities into the enterprise context. However, issues arise in achieving the operating context that is often important in an enterprise but of less import on the consumer internet—namely auditable access control, service management, data protection, context identity management, and cost allocation.

SUMMARY OF THE INVENTION

Various embodiments of the invention may provide a method for operating a REST web service operable to search one or more data sources. In some embodiments, the invention may comprise receiving a query, directed to a first data source, wherein the first data source defines at least one characteristic of at least one first data object returned by the query. Some embodiments of the invention may comprise querying the first data source. Various embodiments of the invention may comprise receiving at least one first data object from the first data source in response to querying the first data source. In some embodiments, the invention may comprise retrieving linked relationships between the at least one first data object and one or more second data objects from a second data source. Some embodiments of the invention may comprise querying the second data source for information on the one or more second data objects. Various embodiments of the invention may comprise receiving the one or more second data objects from the second data source in response to querying the second data source. In some embodiments, the invention may comprise generating a composite data object in response to the received query, the composite data object including the at least one first data object and the one or more second data objects formatted as markup language, wherein the markup language contains embedded functionality therein.

Various embodiments of the invention may provide a method for operating a REST web service operable to provide user-context based access to one or more computing resources, the computing resources including one or more applications and/or one or more searchable data sources. In some embodiments, the invention may comprise setting user context access permissions for each of the one or more resources. Various embodiments of the invention may comprise receiving user context data. In various embodiments, the invention may comprise receiving a request to access the one or more computing resources. In some embodiments, the invention may comprise processing the received user context data to determine if the user context data satisfies the set user context access permissions. Various embodiments of the invention may comprise permitting access to the one or more computing resources when the user context access permissions are satisfied.

Various embodiments of the invention may provide a method for providing user-context based access to a computing resource, the computing resource including an application or a searchable data source. In some embodiments, the invention may comprise setting user context access permissions to the computing resource. Various embodiments of the invention may comprise receiving user context data. In various embodiments, the invention may comprise receiving a request for accessing the computing resource. Some embodiments of the invention may comprise processing the received user context data to determine if the user context data satisfies the set user context access permissions. In some embodiments, the invention may comprise permitting access to the computing resource when the user context access permissions are satisfied.

Various embodiments of the invention may provide a method for making data in a first data source accessible to a REST web service that handles search queries against a plurality of data sources. In some embodiments, the invention may comprise identifying a first set of data in a first data source to be accessible via the web service. Various embodiments of the invention may comprise providing a single view of the first set of data to be accessible via the web service. Some embodiments of the invention may comprise specifying linked relationships between the first set of data in the first data source and one or more sets of data in one or more of the plurality of data sources. In some embodiments, the invention may comprise specifying first access configuration for the first set of data. In various embodiments, the invention may comprise configuring methods to be supported by the first data source. Various embodiments of the invention may comprise providing the access configuration. In some embodiments, the invention may comprise enabling the first set of data to be serialized upon a valid request for the first set of data.

Various embodiments of the invention may provide a method for costing a REST web service operable for querying one or more data sources. In some embodiments, the invention may comprise calculating the cost of operating the web service. In various embodiments, the invention may comprise measuring web service usage data using one or more service metrics, wherein the one or more service metrics include at least one derived service metric. Some embodiments of the invention may comprise choosing at least one service metric from: the one or more service metrics, wherein one or more of the at least one chosen service metrics is a derived service metric. In some embodiments, the invention may comprise calculating the cost of the web service based on the at least one chosen service metric. Various embodiments of the invention may comprise charging for usage of the web service based upon the calculated cost of the web service.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EXEMPLARY EMBODIMENTS

Figure 1:
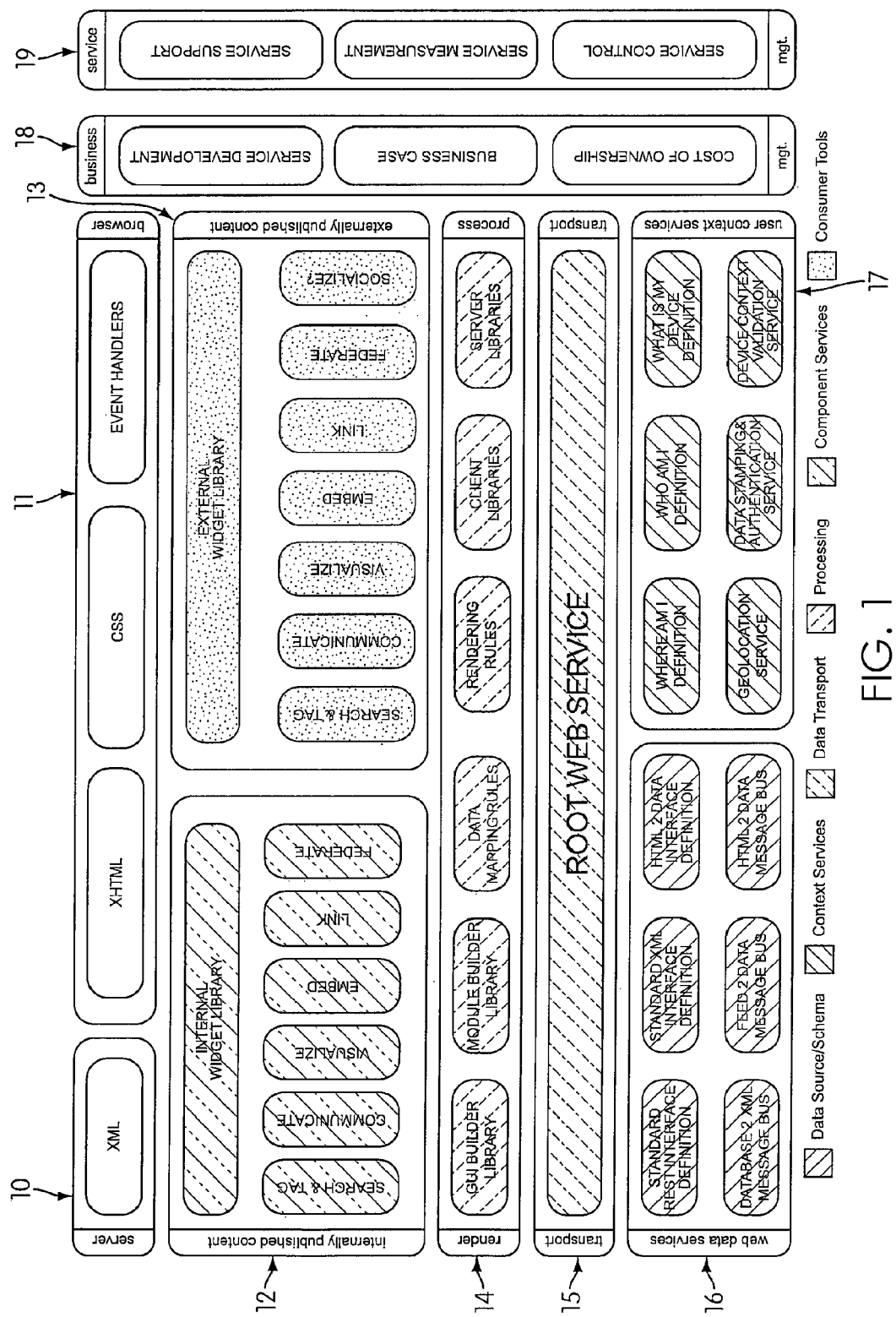
FIGS. 1, 1A, and 1B are block diagrams of a system usable for providing a web service in accordance with various embodiments of the invention.

In some embodiments, the invention may include the ability to access data sources in remote locations without compiling data at a central location. Some embodiments of the invention may provide the ability to access data in a multitude of data sources without requiring a central server to store, update, and maintain the data in the data sources. Some embodiments may also provide the ability to build linked relationships between data fields in one or more data sources. By building linked relationships, some embodiments of the invention may allow a user to access a broader spectrum of data related to a particular search query.

Various embodiments of the invention may be comprised of several components which work together to provide an overall REST web data service. The invention may utilize a web interface which supports searching, binding and/or filtering. The web interface may provide the ability to navigate vertically and/or laterally without rebuilding a query from scratch. The web interface may include one or more data services as required in the requested output. The invention may operate one or more Extensible Markup Language (XML) schemas in unison. One or more schemas may define and/or manage the root web service and one or more schemas per namespace may be included in the requested search scope.

The invention may employ a server-side service. The server-side service may process a query, build a data source collection to search, and/or return a combined set of namespaces as serialized XML. The invention may provide explicit content and/or relationship links to other objects.

In some embodiments, the invention may provide content and/or relationship links to a valid requestor if the requestor has satisfied operating context permissions for exposure of the data. The invention may provide a user service which identifies a current operating context of the user. The user service may present the current operating context of the user to a requesting interface. Based on the current operating context of the user, the server service may determine whether the requestor has sufficient context to receive the requested data. The current operating context of the user may include, but is not limited to, who and/or what the requestor is, where the requestor is located in respect to the data provider, the device the requestor is using to make the request, and/or any other rule definable by data to which the web service has access or can derive from data to which the web service has access.

Various embodiments of the invention may include a client pre-processor that takes a root web service, filters for a subset of attributes, and returns an XML fragment. The client pre-processor may pre-check any source for cross-site scripting (XSS), cross-site request forgery (CSRF), or buffer overflow before attempting to complete any requested functions.

In some embodiments, the invention may treat data as objects. Various embodiments of the invention may treat data as objects with both or either of mutable and immutable properties. Some embodiments of the invention may provide data objects that may be programmable, wherein such programmability may be analogous to the programmability provided by an object oriented programming language. In some embodiments, the invention may provide for the data object to represent the aggregate of multiple sources of related information. In various embodiments, the multiple source of related information may include one or more or all of the data sources available to the web service. By way of example only, the invention may be used to create an employee object which may comprise information related to that employee. In some embodiments, the exemplary employee object could include information about the selected employee in all data sources available to the framework, wherein some of the data sources may be related to that employee specifically or employees generally and other data sources may not be related to either that employee specifically or employees generally. For example, the exemplary employee object could aggregate data regarding the employee from data sources maintained by human resources, the employee's own department, marketing, or other entities, as well as data joined by linked relationships to the data comprising the exemplary employee object.

Various embodiments of the invention may also provide for data objects to support one or more methods, wherein the supported methods mayor may not be related to the data object. In some embodiments, the invention may support both or either of standard and custom methods. Various embodiments of the invention may allow a data source to define one or more functions that the data source provides. For example, using the illustration of the exemplary employee object, the data object could include methods allowing a user to change the employee's salary, promote the employee, or perform other tasks as desired. In some embodiments, the invention may define data objects through REST queryable classes.

Various embodiments of the invention may provide standards and tools to manage data from one or more applications or data sources into one or more cross-platform web data services. Some embodiments may be deployed in an enterprise context to manage the description, visualization, and consumption of data from one or more applications or data sources. In the enterprise context, various embodiments of the invention may render and visualize content based on enterprise brand rules and user preferences. Various embodiments of the invention may be utilized to facilitate the manner, control, and service of data presentation. Various embodiments of the invention may employ data independent visualization and direct consumption.

Figure 2:
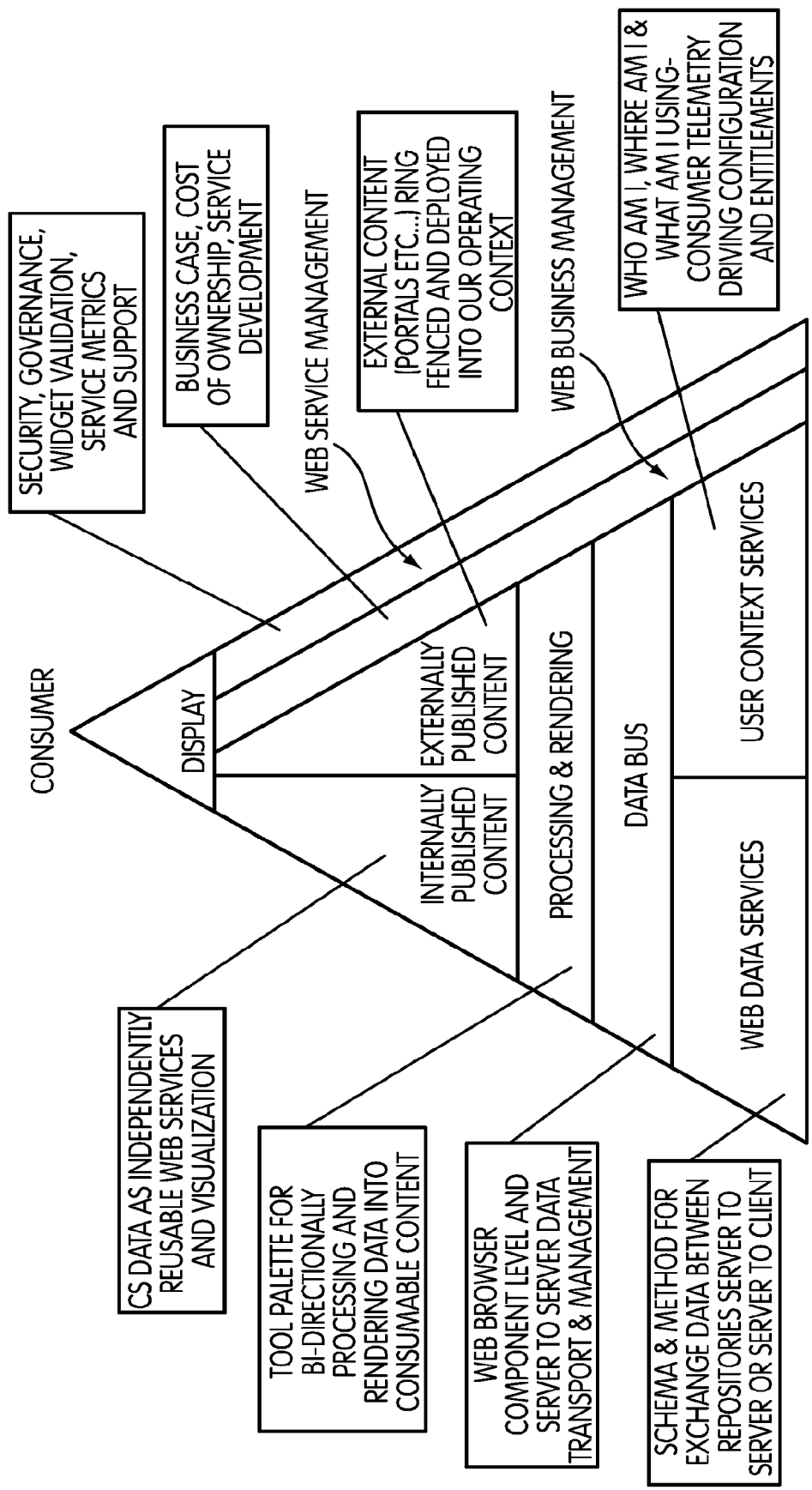
FIG. 2 is a block diagram of a system usable for providing a web service in accordance with various embodiments of the invention.
Figure 3:
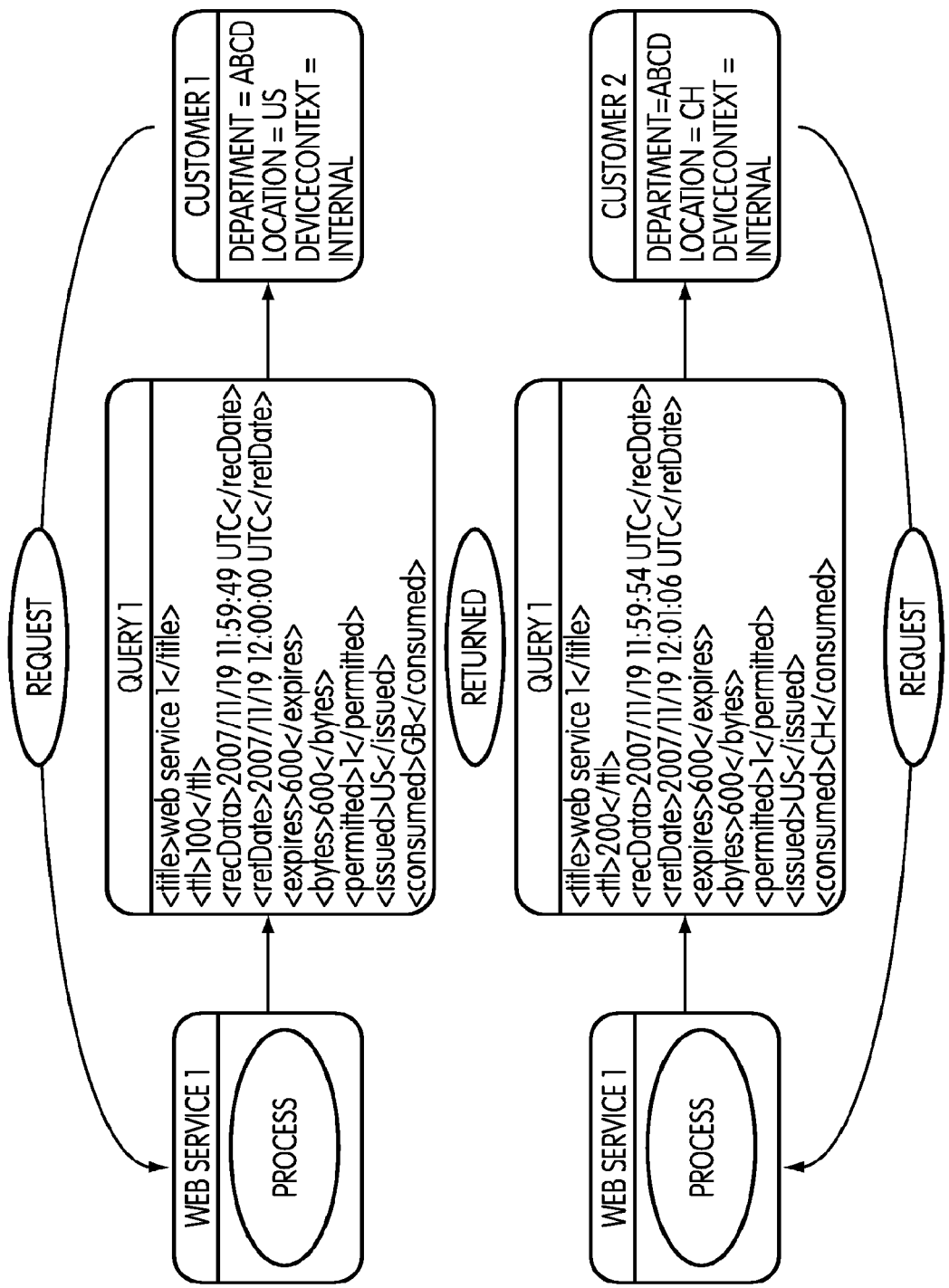
FIG. 3 is a block diagram of a method for managing access control and measuring performance of a web service in accordance with various embodiments of the invention.

In some embodiments, the invention may operate in the context illustrated in FIG. 2. Various embodiments of the invention may be operated in the enterprise context where an enterprise may desire to access and/or display internally published content and/or externally published content by means of a web service. In some embodiments, the invention provides data for display that can be processed and rendered into consumable content according to conventional methods. The web service may function as a data bus for accessing and/or returning data. As illustrated in FIG. 2, the web service may provide web data services for exchanging, interrogating, and/or retrieving data from one or more known data sources. The web service may be operable to provide user context services to determine configuration and entitlements. The invention may be operable to provide web service management, which may include one or more of providing security, governance, container validation, service metrics, and/or support for a web service. In some embodiments, the invention may be operable to provide web business management, which may allow an enterprise to determine business case, cost of ownership, and/or service management.

Figure 1A:
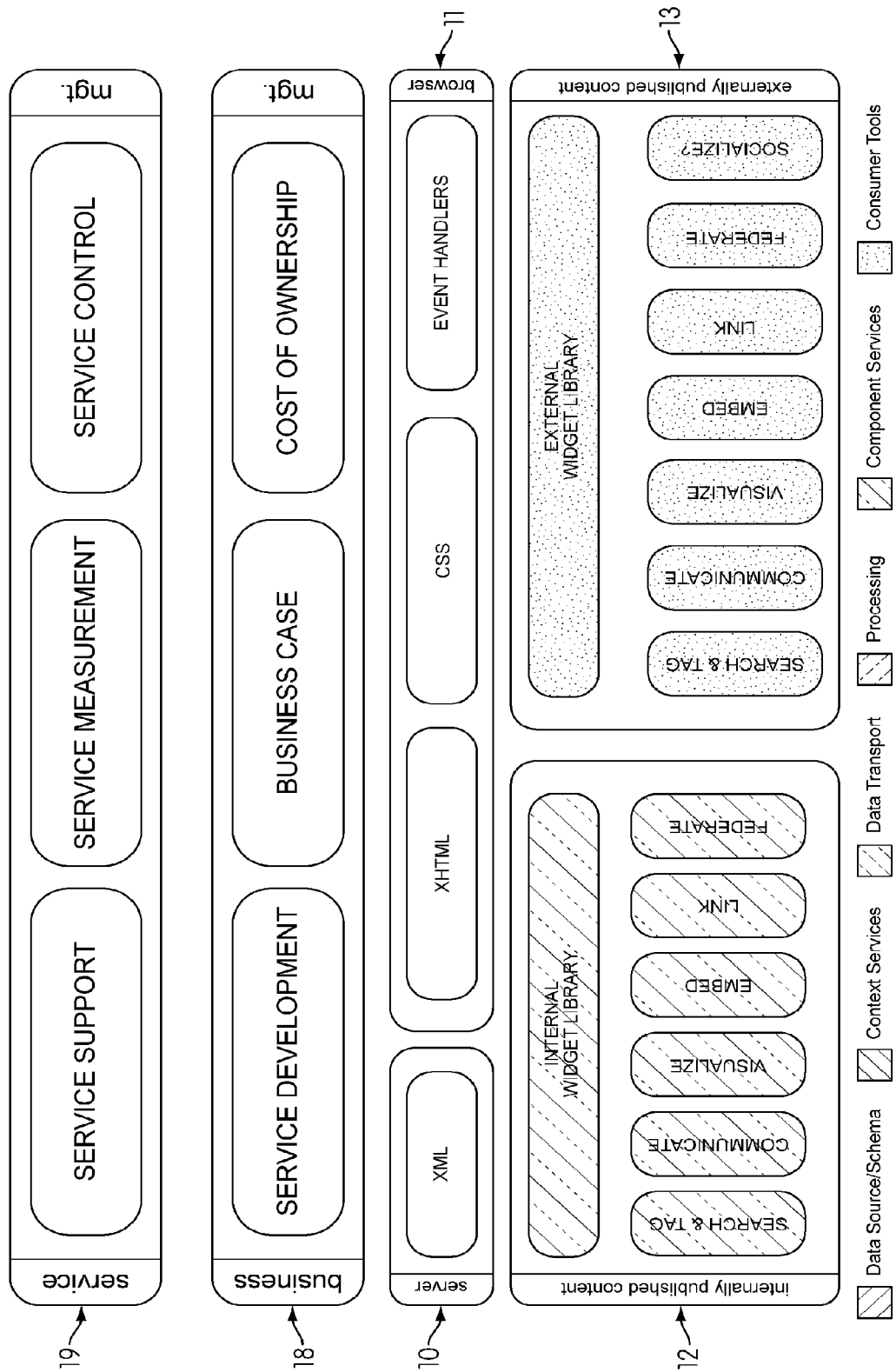
Figure 1B:
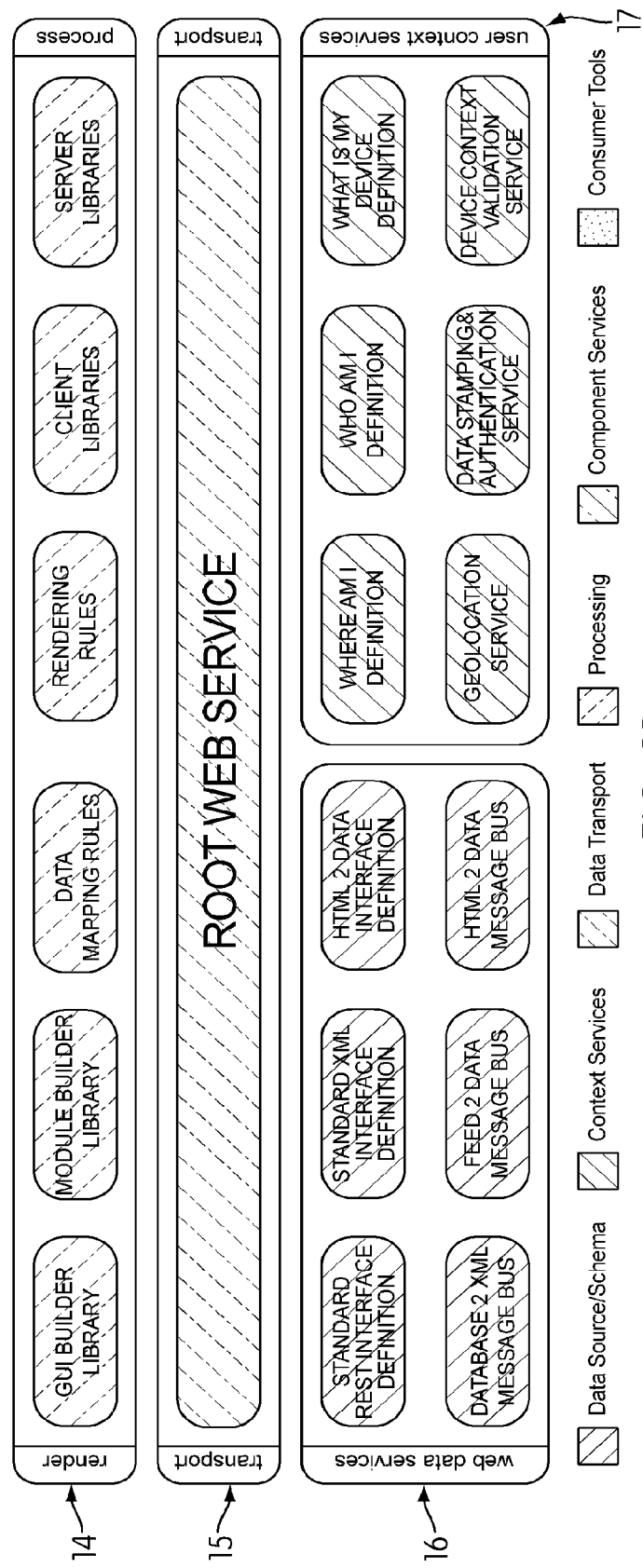

In some embodiments, the invention may be comprised of components as illustrated in FIGS. 1, 1A and 1B. At the server level, communication may occur in XML 10. By using a web browser or graphical user interface (GUI), the system may employ Extensible Hypertext Markup Language (XHMTL) using Cascading Style Sheets (CSS) and event handlers 11. Some embodiments of the invention may use both internal 12 and external 13 widget libraries to provide component widgets and services. Internal component widget services 12 may be searched and tagged, communicated, visualized, embedded, linked, and/or federated. External component widget services 13 may be searched and tagged, communicated, visualized, embedded, linked, federated, and/or socialized. Various embodiments of the invention may employ various processes to provide external component widget services 13, including, but not limited to one or more GUI builder libraries, module builder libraries, data mapping rules, rendering rules, client libraries, server libraries, data factories, plug-ins, and/or adapters 14.

As illustrated in FIGS. 1, 1A and 1B, various embodiments of the invention may provide a root web service 15. The root web service 15 may be operable as a data bus for transporting data. Various embodiments of the invention may employ interface definitions or message busses 16 to exchange data. Interface definitions 16 may include, but are not limited to, one or more of standard REST interface definitions, standard XML interface definitions, and/or HTML to data interface definitions. Message busses 16 may include, but are not limited to, one or more of database to XML message busses, feed to data message busses, and/or HTML to data message busses. Some embodiments of the invention may provide user context services 17, which may require definitions and services to implement. User context services 17 definitions may include, but are not limited to, one or more of location definitions, user identity definitions, and/or user access terminal or device definitions. Services employed to provide user context services 17 may include, but are not limited to, one or more of geo-location services, data stamping and authentication services, and device context validation services. As illustrated in FIGS. 1, 1A and 1B, in some embodiments, the web service may be operable to provide business management 18 and service management 19 tools. Business management tools may comprise tools operable to determine and/or provide information related to, for example, service development, business case, and cost of ownership. Service management tools may be operable to provide, for example, service support, service measurement, and/or service control.

Some embodiments of the invention may use object oriented and XML terminology in its description: For the purposes of clarification, object oriented language may be used to define the web interface and XML terminology may be used to describe serialized output.

Figure 9A:
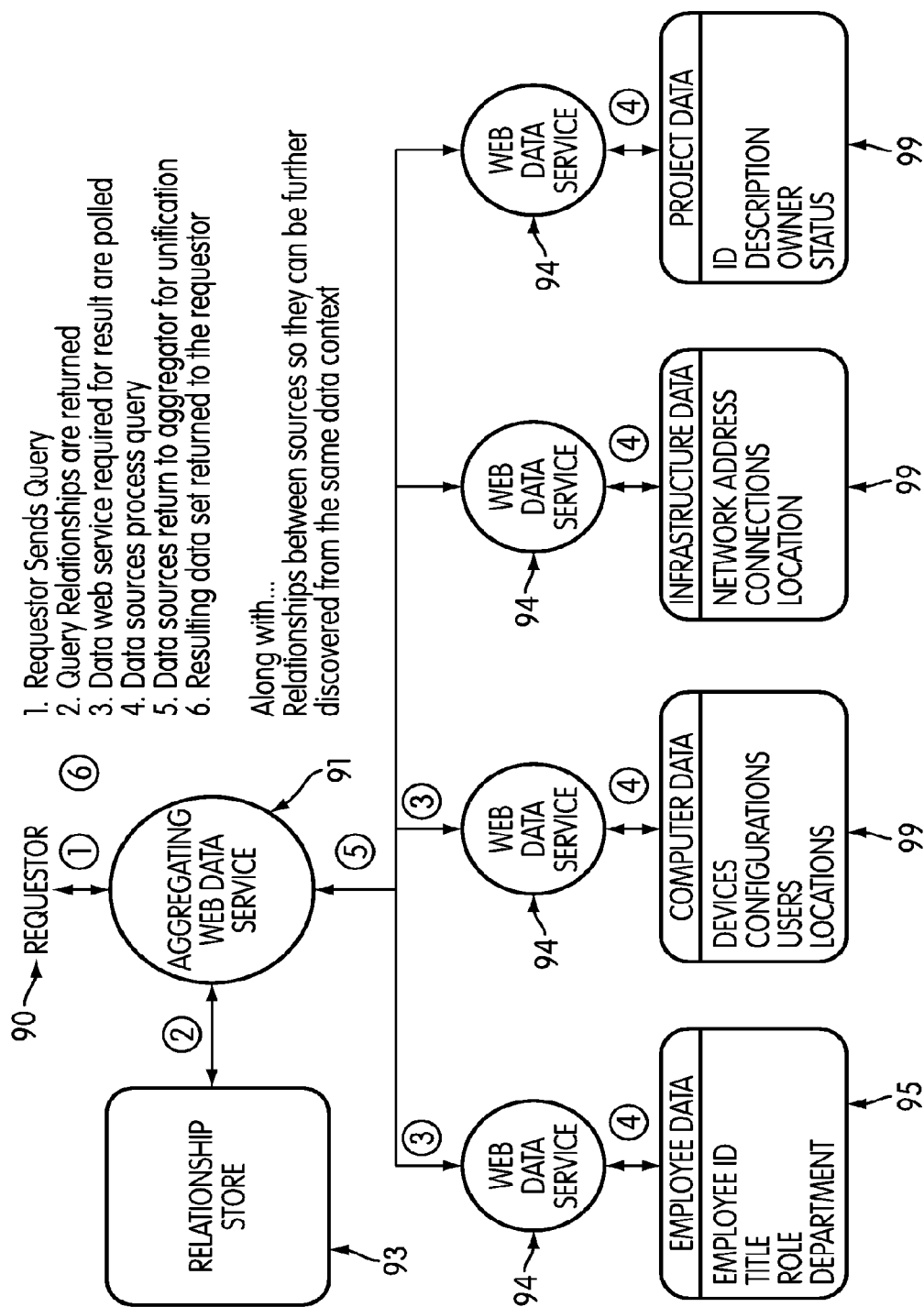
FIGS. 9A, 9B, and 9C are block and flow diagrams illustrating the operation of an aggregating web data service and relationship store in accordance with various embodiments of the invention.
Figure 9B:
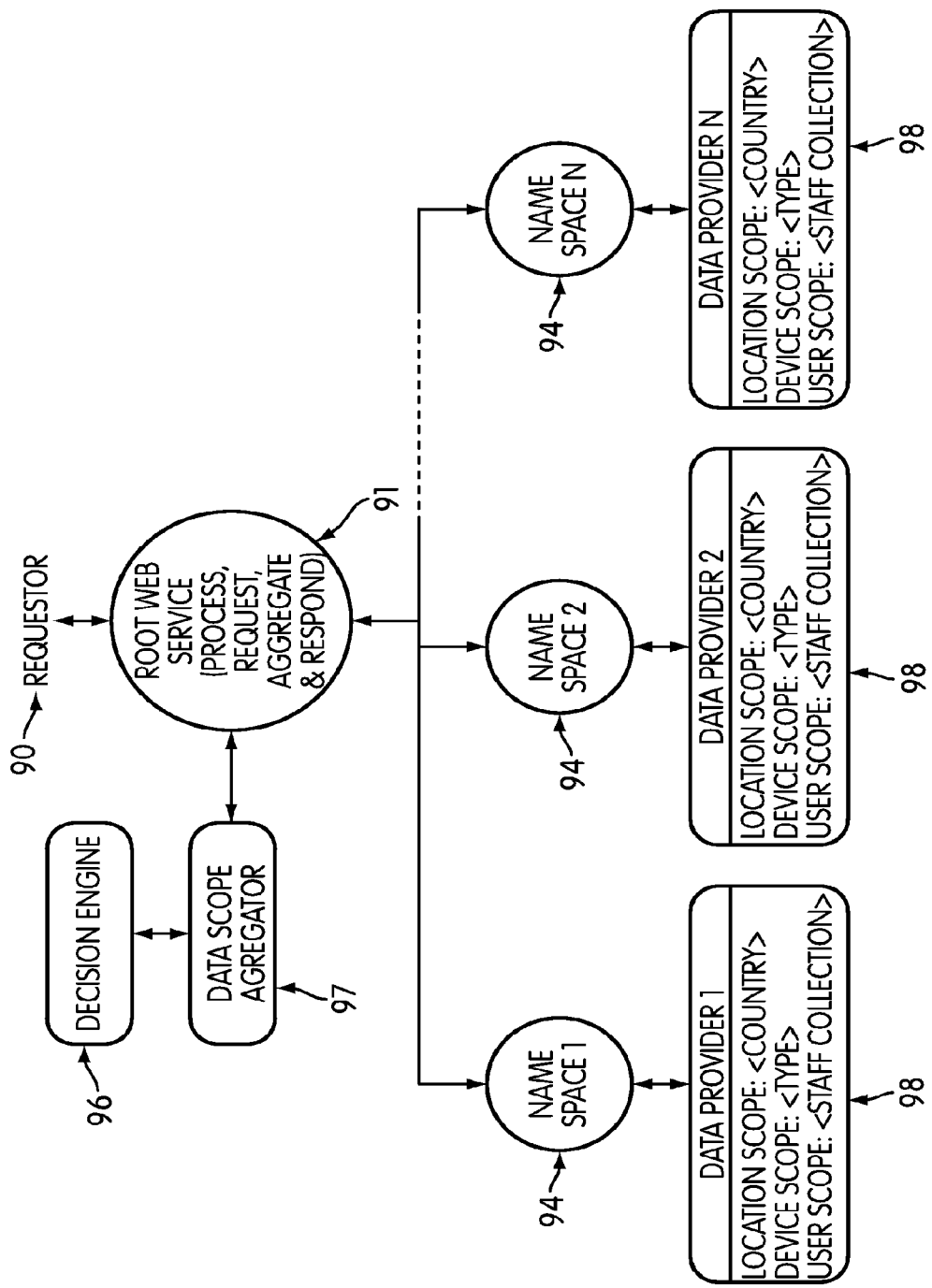
Figure 9C:
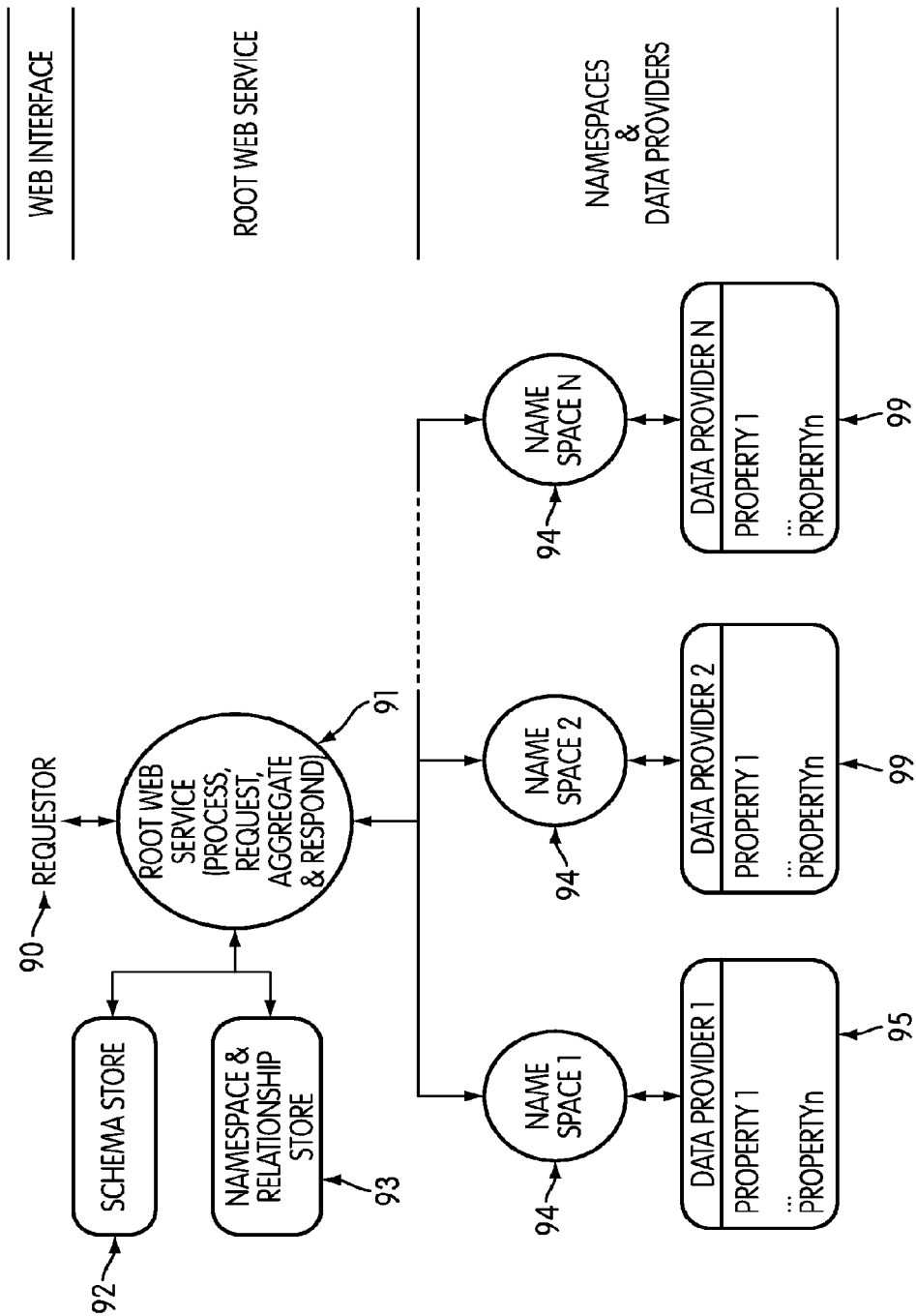

Various embodiments of the invention may provide a method for constructing one or more interfaces 90 which may be operable to query one or more known data sources 94, as illustrated in FIGS. 9A and 9C. In some embodiments, the known data sources 94 may comprise a storage device, which may include one or more of floppy disks, hard disks, optical disks, tapes, or other storage devices for storing computer-executable instructions and/or data. The known data sources 94 may be structured data sources. The known data sources 94 may be interrogated per request or as a whole. In addition, the known data sources 94 may include, but are not limited to, databases, flat files, web services and/or web pages. The querying function may occur via hypertext transfer protocol (HTTP). The method may render one or more source formats as serialized XML without changing or relocating the source data or format. In some embodiments, a consumer may be able to choose the context for consumption. Various embodiments of the invention may also allow an enterprise to choose the context for consumption. According to various embodiments of the invention, data returned by the search query may include a method for acquisition of additional data. The method may include a link, function, filter, wildcard, or other browser, GUI, or consumer supported method. Data results from a search query may include a description of the content, as well as any number of root links to guide future queries.

In some embodiments, the invention may utilize a root web service 91 and/or aggregating web data service 91 technical architecture operable for receiving a search query 90 directed to one or more first data fields from a first data source 94 as illustrated in FIGS. 9A and 9C. Root web service 91 and/or aggregating web data service 91 may be operated on a computing device. The computing device may comprise a general purpose computer programmed to execute instructions for operating a root web service (and/or other software and/or software applications) that enables the various features and functions of the invention, as described in greater detail herein. Those having skill in the art will recognize that a computing device for operating a root web service 91 and/or aggregating web data service 91 may comprise a processor, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data which may be manipulated by the processor. The storage devices may comprise floppy disks, hard disks, optical disks, tapes, or other storage devices for storing computer-executable instructions and/or data. One or more applications, including any applications capable of executing instructions for operating a root web service and/or aggregating web data service, may be loaded into memory and run on an operating system of a computer, server, or other device capable of executing such instructions. The root web service 91 and/or aggregating web data service 91 may comprise software module(s) which may enable the features and functionality and implement the various methods (or algorithms) described in detail herein. Further, as noted above, the root web service 91 and/or aggregating web data service 91 may be referred to interchangeably herein as "root web service," "REST web service," or "aggregating web data service." In some implementations, an Application Program Interface (API) may be provided to, for example, enable third-party developers to create complimentary applications, and/or to enable content exchange.

In some embodiments, a requestor 90 may send a query to the web service 91. Various embodiments of the invention may allow the requestor to send the query via a web interface. The web service 91 may receive and process the request. In some embodiments, the invention may utilize a schema store 92 and/or a namespace and relationship store 93. A schema store 92 may be utilized in the serialization of the aggregated responses. The namespace and relationship store 93 may be used to determine linked relationships between one or more data fields in one or more namespace 94. In some embodiments, the root web service 91 may be operable to retrieve linked relationships between the one or more first data fields in a first data source 94 and one or more second data fields in one or more second data sources 99 by means of the namespace and relationship store 93. Various embodiments of the invention may utilize the namespace and relationship store 93 to supplement the response to the request with relationships between data sources. The supplemental relationships may provide the requestor with the ability to discover additional data from the same data context. In some embodiments, the invention may be operable to query the first data source 94 for information on the one or more first data fields. In some embodiments, the first data source 94 may comprise a storage device, which may include one or more of floppy disks, hard disks, optical disks, tapes, or other storage devices for storing computer-executable instructions and/or data. Various embodiments of the invention may be operable to query the one or more second data sources 99 for information on the one or more second data fields. The invention may be operable to receive first information from the first data source 99 and second information from the one or more second data sources 99 in response to queries made to each. In some embodiments, the invention may aggregate one or more responses to the query from the one or more data sources 94, generating combined information in response to the search query, the combined information including the first information and the second information. Various embodiments of the invention may format the response in markup language. In some embodiments, the response formatted as markup language may contain embedded functionality therein.

In some embodiments, the invention may use an alternative repository, such as a database, XML file, or CMDB as a namespace and relationship store 93. A alternative repository 93 may be used to record, store, search, and/or discover relationships between objects, whether those relationships are precedent or dependent. Various embodiments of the invention allow access to source provider unique data sets 94 joined by a set of known relationships. An alternative repository 93 may be used to record, store, search, and/or discover these known relationships. Some embodiments may have their own internal XML schema to additionally define how data may be accessed. Known relationships between data sources may provide the web service with a means of linking data fields from multiple data sources to provide greater access to data across a plane of data sources, each of which may be similarly or differently structured.

Various embodiments of the invention may employ a web interface 90 utilizing a REST uniform resource locator (URL). A REST interface may use a standard query string construct to build a query to be processed by the server root 91. The web interface 90 may support various basic constructs, such as: (1) a search interface which may include one or more interfaces per class contributing to the data service catalog; (2) a collection navigator—all data may be returned as a collection; and/or (3) a set of methods for pre-filtering the result set. The query may be constructed in readable form and may support chaining so that vertical and horizontal navigation can be constructed on the fly in a way that lends itself to automation.

In some embodiments of the invention, the root construct supports at least two constructors. In some embodiments, a first constructor may be used to search for matching content across a prescribed set of data providers or all data providers. For example, in some embodiments, the invention may use a first constructor as illustrated below:
?sd=1&t=n&dp=dp1|dp2|dpn&q=ObjectToSearch(Filter-Scope).
In some embodiments, a second constructor may be used to return the content and relationships of known identity, as illustrated below:
?t=n&q=Object("ID").
In some embodiments, all arguments may be overloaded in each case. In various embodiments, the "q" argument may be mandatory.

Various embodiments of the invention may optionally specify the maximum permitted time to respond in integer seconds by the "t" argument. In some embodiments, if the t argument is not specified, the response takes as long as required. The inclusion of this parameter may force the query processor to cancel any pending federated requests and returns a timeout to the requestor along with any thus far completed federated requests once the time limit has been reached. In some embodiments, the invention may provide business and service management tools. Business and service management tools may be implemented by setting service tolerances for query execution, for example by the "t" argument. Various embodiments of the invention may be operable to manage the root web service if the maximum permitted time to respond is exceeded and/or the request does not fully complete. Service tolerances, time limits, and/or service levels may be set per provider or for one or more providers and/or per service request. In some embodiments, the invention may be operable to log one or more requests to the web service, response time, and/or compliance with service tolerances for one or more data sources or application.

In some embodiments, data providers may optionally be set or specified using the "dp" argument. At least one provider may be specified if the "dp" argument is used. The provider name may be the namespace of the underlying XML schema. If the "dp" argument is not included, all providers which expose objects of type specified in the search may be interrogated.

Various embodiments may optionally return the associated service performance data. In some embodiments, return of the associated service performance data can be accomplished by setting the value an argument, for example, the "sd" argument. In some embodiments, setting the value of the "sd" argument to 1 (one) may specify that associated service performance data is returned. In various embodiments, omitting the argument may omit the service data from the initial response. In some embodiments, the service data may be recovered at a later time with query functions.

In some embodiments, results may be returned as serialized XML. The returned XML may be a standard node collection.

The nodes may include text content or further opportunities for navigation. If an error is raised, the XML may return the error type. The Root Construct is abbreviated as "?Root" for purposes of this document to promote clarity.

In some embodiments, if a serialized object is returned without error from the Root Construct, the interface may support a number of different extensions to either further navigate or enumerate content, as well as the ability to append a number of utility functions as required. Root Extensions may be optional. The examples below enumerate these different scenarios.
?Root<.[Property|Function<(parameters)>]><.[Property-|Function<(parameters)>]>

In some embodiments, root properties offer a method of shortcutting the required entry in the result or changing the direction of the query. Various embodiments of the invention support root properties, including properties for accessing children of the content element, a parent object of the query results, and/or horizontally related objects to the result. For example, various embodiments of the invention may utilize at least the following root properties: ".Item(n)", ".Parent", and ".AttributeId". The Root Property ".Item(n)" may return the nth child of the content element. The Root Property ".Parent" may return the parent object of the query result. The Root Property ".AttributeId" may return the horizontally related object.

Various embodiments of the invention support conditions. Various embodiments of the invention may use conditions to filter the data returned by a search query. Conditions may be implemented at least at the root level or within a function at any time a result is returned. The structure below represents an exemplary basic condition structure.
("attribute","operand","value")
Double quotes may be used to force the query parser to read the condition as a string. The contents of the string may be HTML encoded prior to submission of the query. Supported operands include, but are not limited to, =, < >, <=, >=, <, >, "LIKE", and "REGEX". In some embodiments, when "LIKE" is used, the % wildcard must be added to the attribute value and may be replaced by "%25" once HTML encoded.

In some embodiments, root utility functions provide methods to filter the query result before it is returned to the requestor. The functions may emulate the select qualifiers used in a structured query language. Utility functions may be designed to reduce the number of requests made and the amount of post request processing required by the consuming service. For example, in some embodiments supported root utility functions may include, but are not limited to: (1) ".Filter('attribute', 'operand', 'value'); (2) ".Distinct('attribute'); (3) ".Sum('attribute')"; and ".Count('attribute')". In some embodiments, the "Filter" and "Distinct" functions can be chained. In various embodiments, the "Sum" and "Count" functions may be terminal. Various embodiments of the invention may allow data providers to provide custom functions in addition to the root utility functions enumerated above.

In some embodiments, the root web service comprises at least two components which may operate in parallel and may not interact directly, but use a common component core to perform their various functions: (1) query listener, parser, and execution service; and (2) data provider on-boarding process.

Various embodiments of the invention may use the server-side query listener, parser, and execution service to perform the following tasks. This server-side service may receive and process received queries and respond to the requestor and, among other tasks: receive the requestor queries; receive the user context definition; parse the request query; make a multi-step access control decision required to return data; issue down stream data provider requests; receive data provider requests; process data provider requests; collate data to return to create the content node; compile the service metrics for the service data node; and/or return a composite response object of serialized XML to the requestor.

Various embodiments of the invention provide the capability for making request context and subsequent authorization decisions per request. In some embodiments, the consuming application may present the information required by the data providers to be queried. For example, the invention may consider current location, device content and identity in triplicate as discussed below.

Figure 11:
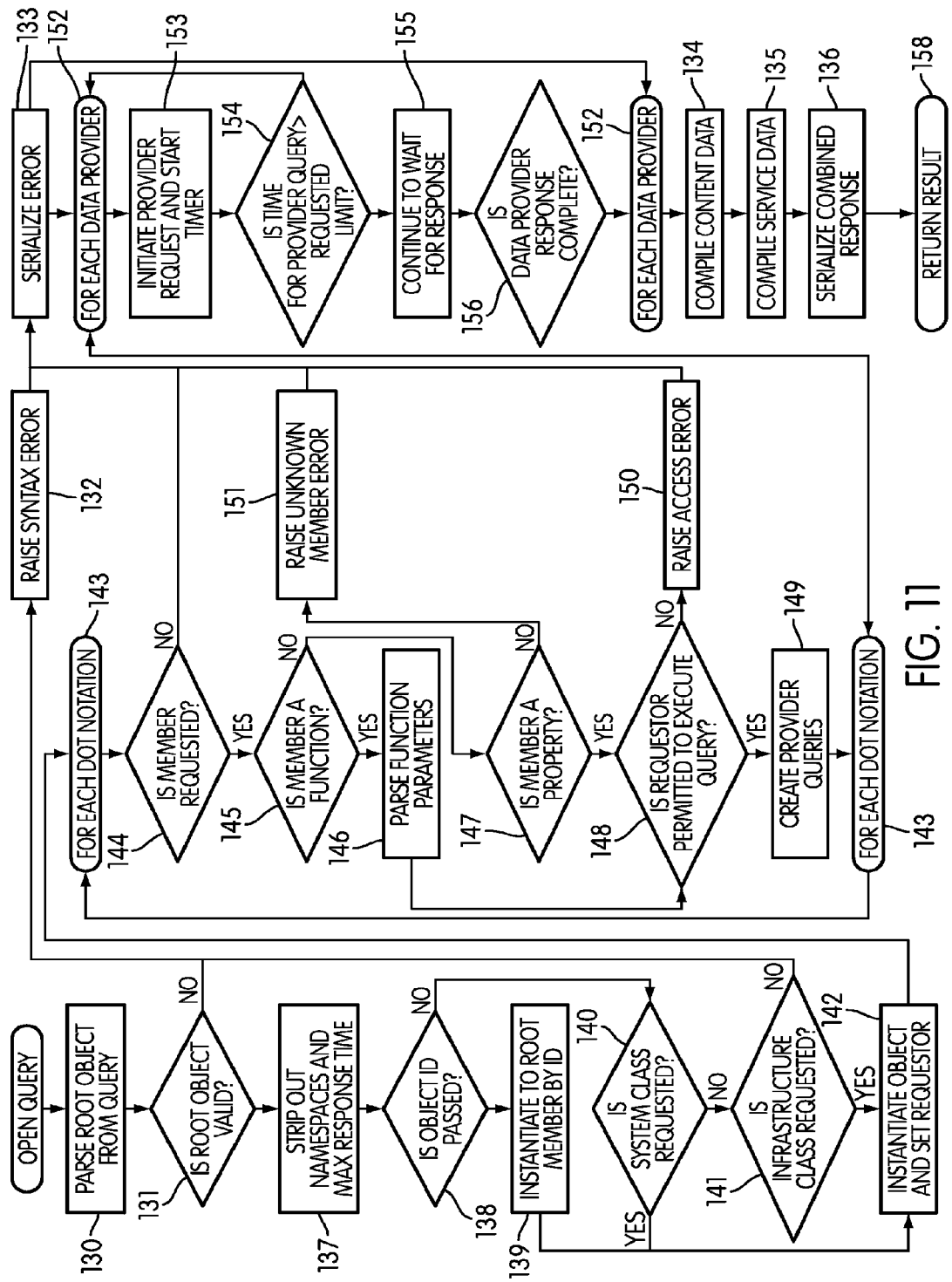
FIG. 11 is a flow diagram of a method for performing a search query operation in accordance with various embodiments of the invention.

In some embodiments, the invention may use a web service to execute a method for performing a search query on one or more data sources as illustrated in FIG. 11. As illustrated therein, a search query may be executed by first parsing a root object from the search query 130. If the root object is not valid 131, the system may, for each data provider, raise a syntax error 132, serialize the error 133, compile content 134 and service data 135, serialize the combined response 137 and return a result 158. If the root object is valid 131, the system may strip out namespaces and maximum response time 137 and determine if object identification is passed 138. If object identification is passed 138, the system may instantiate to a root member by identification 139 and instantiate an object and set a requestor 142. If object identification is not passed 138, the system may then determine if a system class is requested 139. If a system class is requested, the system may instantiate an object and set a requestor 142. If a system class is not requested 139, the system may determine if an infrastructure class is requested 141. If an infrastructure class is not requested 141, the system may, for each data provider 152, raise a syntax error 132, serialize the error 133, compile content 134 and service data 135, serialize the combined response 136 and return a result 158. For each dot notation 143, the system may then determine if a member is requested 144. If a member is not requested 144, the system may serialize the error 133, compile content 134 and service data 135, serialize the combined response 136 and return a result 158. If a member is requested 144, the system may determine if the member is a function 145. If the member is a function 145, the system may parse the function parameters 146 and determine if the requestor is permitted to execute the query 148. If the member is not a function 145, the system may determine if the member is a property 147. If the member is not a property 147, they system may, for each data provider 152, raise an unknown member error 151, serialize the error 133, compile content 134 and service data 135, serialize the combined response 136 and return a result 158. If the member is a property 147, the system may then determine if the requestor is permitted to execute the query 148. Having determined if the requestor is permitted to execute the query 148, the system may create provider queries 149 and repeat for each dot notation or raise an access error 150, serialize the error 133, compile content 134 and service data 135, serialize the combined response 136 and return a result 137. If the system has completed processing for each dot notation without any errors, the system may, for each provider 152, initiate a provider request and start a timer 153. If the time limit for the provider query has expired 154, the system may serialize the error 133, compile content 134 and service data 135, serialize the combined response 136 and return a result 158. If the time limit for the provider query has not expired 154, the system may continue to wait for a response 155. If the response is complete 156, the system may compile content 134 and service data 135, serialize the combined response 136 and return a result 158. If the response is not complete 156, the system may continue to wait for a response until the time limit for the provider query has expired.

In some embodiments, generic client content caching may be automatically done by web browsers. Various embodiments of the invention may permit specific headers to be configured in the requesting query to prevent automatic caching or set specific expiry properties. Server caching can also be configured per application requirements on many web server products.

Various embodiments of the invention may not use basic web server application settings to configure caching. Specified web server application settings to configure caching may not be preferable because blanket content caching of data would mean content has been relocated from its source. Relocating data from its source could introduce certain undesirable situations. For example, data may be relocated outside of the country in which it is permitted to be stored; data which should be reacquired at each request for access may instead be taken from the cache; and/or the data provider may lose control of how their data is consumed.

In some embodiments, the application builder may identify when caching is acceptable and/or preferable. Various embodiments of the invention may use property level cache settings in a system classes interface to define the application's caching behavior. Various embodiments of the invention may use a system classes interface using the format "System.Systemclasses," for example. In some embodiments, it is not possible for the server services to control the client cache.

Various embodiments of the invention may include two caches—public and private. In some embodiments, if a result is to be cached, then it is cached according to the cache attribute definition in the elements "System.SystemClasses"

query. Public data may be cached per request and can be retrieved by any authorized requestor. Private data may be cached per user, per device context and/or per request. A file based cached may be utilized. All expired entries may be cleaned at regular intervals by a maintenance service and/or each time the data model and/or access control rules are changed. In some embodiments, only the logon under which the root service is running has access to the file cache. Storing by requestor and device context may prevent a requestor from being authorized for data in one context and then retrieving from the cache in a different context. For example, in some embodiments, controlling caching may allow the requestor to properly access the data in an authorized location, such as the requestor's office, but prevent cached data from later being displayed if the context has changed to an unauthorized location, such as a public wireless access point.

In some embodiments, neither all user or per user permissions are required on cache files. In this way, the service may manage its own access and caches according to the data provider's definitions. Installing a secondary permissioning system, such as file permissions on top of the data provider settings, may introduce a control risk that the file and data provider permissions do not match. Further, if a requestor changed operating context during a cache expiration period, then that requestor may be able to receive data in an erroneous context.

Various embodiments of the invention may permit the request timestamp to provide the time at which the cache begins to count down. If an entry is present in the cache but the cache has expired, the query processor may request a new query be processed. If the cache has not yet expired, the request context may be positively revalidated and the data may be returned from the cache. In some embodiments, the invention may use an attribute, for example an "ischached" attribute of the "RequestContext", and update that attribute accordingly. In some embodiments, timestamps in the content element of returned xml may be updated to show the cache timestamp.

The invention may provide a schema for returning how a dataset may best be visualized without committing to a product specific implementation or specific encapsulation format.

In some embodiments, the invention may provide an on-boarding method that may permit a new data provider to join the existing framework of data providers. Various embodiments of the invention may provide an on-boarding method which may define how to construct a public view of the data the on-boarded data provider wants to expose through the framework, the permissions necessary for accessing the exposed data, and any linked relationships between the unique content of the exposed data and reference data already available through the framework. Some embodiments of the invention permit the building of data relationships, wherein these data relationships may be universally describable and accessible to providers and consumers. In some embodiments, the invention may allow the specification of service levels, service tolerances, and/or time limits per service provider and/or per service request.

Various embodiments of the invention may host an on-boarding process to define the sequence of tasks required for a new source data provider to join the service framework. A sequence of tasks may be required to ensure that a request made to the data provider through the root service correctly interprets requirements for authorization, caching, filtering, or other settings. Omitting a task or incorrectly defining values may result in data being presented in contexts in which that data was not intended to be presented. Various embodiments of the invention may place the responsibility for initially setting, as well as later updating, values for the settings configured during the on-boarding process on the data provider. In some embodiments, the root service owner may be responsible per implementation to maintain the settings implemented to those set by the data provider.

Various embodiments of the invention may require the data provider to perform one or more of the following tasks: defile the data to be contributed to the framework; collate data into one source location which may be a database view, file, and or table as required; create an account for the framework to access the data in situ; grant read permissions for the framework to the source location; define data class names and XML namespace to be used; define data types for any strongly typed information; for each field in the view, identify whether it is existing framework data or locally unique; define class members for each locally unique data field; define class member properties for each locally unique data field; define class members & properties already in framework which map common data; identify team member who will validate the restricted implementation; and/or define the service level agreement (SLA) and recovery cost charges for utilization of the data source.

In some embodiments, after the data provider has completed any on-boarding tasks, the root service owner may perform one or more of the following tasks: create defined classes and class members; set class and member property values; implement service to data provider connection; create relationship links for common data; create object globally unique identifiers (GUIDS) to identify unique data; create search interfaces; join one or more data providers to framework; and/or lock access to provided quality assurance (QA) tester.

In some embodiments, the data framework may be opened up for consumption by all consumers of the service who meet the settings specified after the data provider has validated that the framework is configured correctly. In various embodiments, it may be preferable for the data provider and service framework owner to agree on a set of acceptance criteria that, when met, both the data provider and service framework owner understand completes implementation.

In some embodiments, if the data source scope changes and new data will be published to the framework, the on-boarding process may be repeated for the fields to be added. In some embodiments, if the scope is to be reduced, the data service may need to be disconnected and the relationship GUIDS that link the content of the data service may need to be removed from the relationship store.

In some embodiments, the data provider preferably may stage the data that the data provider contributes to the framework separately to the data provider's source repository. This staging may allow the root service to access the data in isolation rather than interacting directly with the data source. In the event that an XSS attack through the root service to the data provider fails to be detected, only the staged data may be at risk. According to this embodiment, the data provider can, at any time, remove access to the staged data. In some embodiments, if the data provider removes access to the staged data, the root service query may fail, but data access may remain with the data provider and the root service can only impersonate the data provider within constraints set by the data provider. The root service may not inherit higher level privilege through impersonation.

Figure 12:
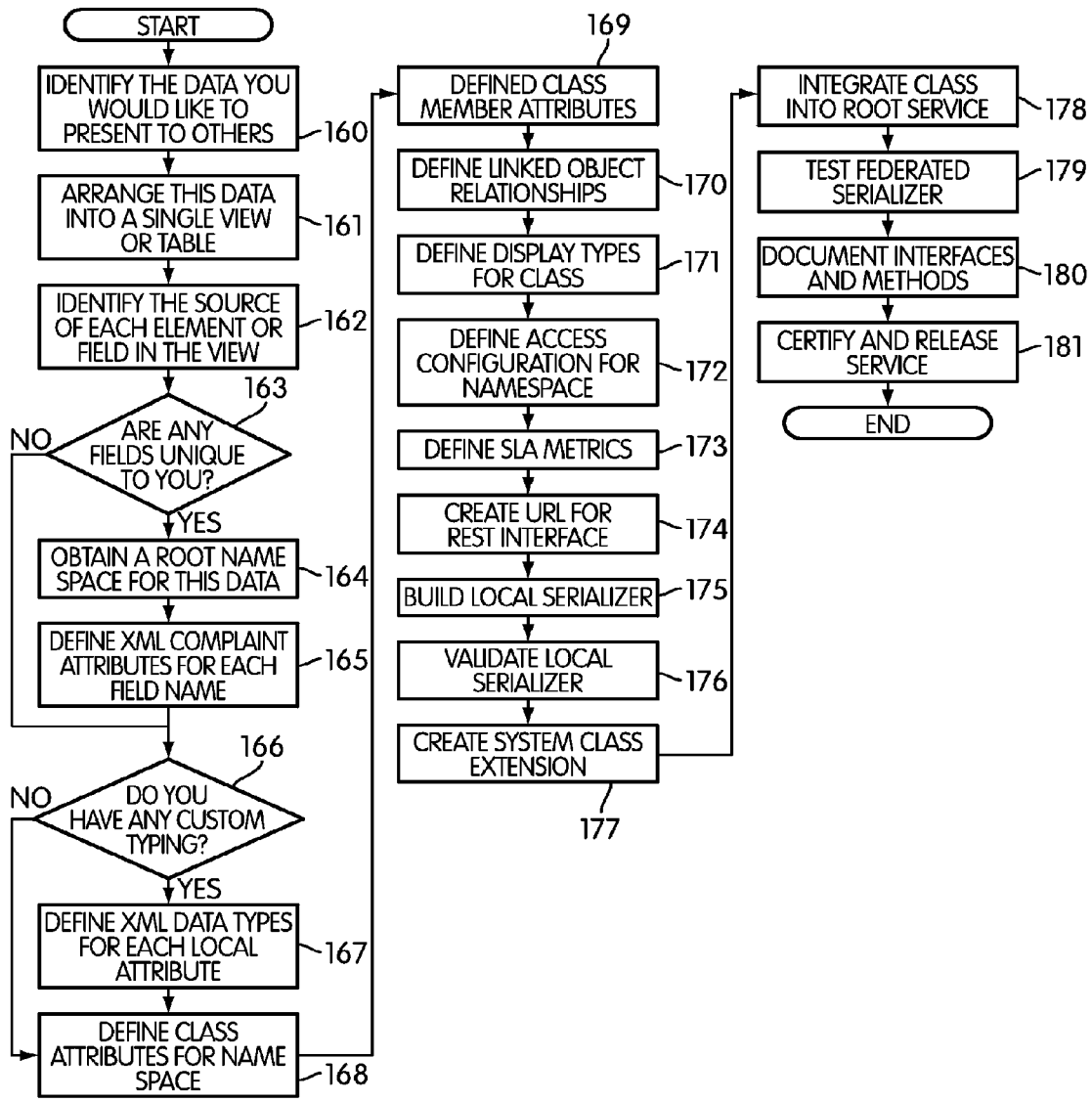
FIG. 12 is a flow diagram of a method for registering a data source for searching by a web service in accordance with various embodiments of the invention.

The on-boarding process that may be used in some embodiments is illustrated in FIG. 12. Additional tasks specific to the data provider may be inserted into the exemplary flow of FIG. 12 as required.

In some embodiments, the invention may utilize a method for adding one or more data sources to a relationship storing component as illustrated in FIG. 12. To add a data source to the relationship storing component, some embodiments may first identify the data to be presented to others 160 and organize that data into a single view or table 161. Some embodiments may identify the source of each element, field, or other data object in the view or table 162. If any fields are unique to the data service 163, some embodiments may obtain a root name space for the unique data 164 and define XML compliant attributes for each field name 165. Various embodiments of the invention may determine if any custom typing is included in the data source 166. If any custom typing is included in the data source 166, some embodiments may define XML data types for each local attribute 167. The invention may define class attributes 168 and class member attributes 169 for the name space.

As illustrated in FIG. 12, various embodiments of the invention may define linked object relationships 170 between the first on-boarded name space and/or data source and one or more second name spaces and/or data sources that have been previously on-boarded. For example, the first name space may contain a first data field previously identified 160 which may contain data related to a first attribute, for example "Employee ID". The one or more second name spaces may contain one or more second data fields previously identified to contain data related to the first attribute, "Employee ID". The invention may, for example, define linked relationships between the first "Employee ID" data field in the first data source and one or more second "Employee ID" data fields in the one or more second data sources 170. Having defined a linked relationship between the first "Employee ID" data field and the one or more second "Employee ID" data fields, in some embodiments, if a search query is directed to the one or more second "Employee ID" data fields of the one or more second data sources, the invention may additionally query the first data source because of the linked relationship between the first and second "Employee ID" data fields. Various embodiments of the invention may access and/or return data in one or more data entries in one or more third data fields of the first data source, wherein the one or more data entries correspond to a match from a query of the first "Employee ID" data field of the first data source.

As illustrated in FIG. 12, various embodiments of the invention may define display types for the class 171, access configuration for the name space 172, and SLA metrics 173. The invention may create a URL for a REST interface 177, build a local serializer 175 and validate the local serializer 176, create a system class extension 177, integrate the class into root service 178, test a federated serializer 179, and document interfaces and methods 180. Having completed the above procedure, a data source may be certified and released for service 181.

Various embodiments of the invention may utilize a document element, for example a "response" document element, containing at least one child node, for example "content," which may contain the serialized response to the query. In some embodiments, an optional second child node, for example "servicedata", may be included if the a parameter has been set in the query string, for example an "sd" parameter. An example is below:

```
<?xml version="1.0" encoding="UTF-8"?>
<sd:response xmlns:sd="uri://credit-suisse.com/sd/year/name">
    <sd:servicedata>
        <sd:reqUTC>2007/12/10 11:58:14.000</sd:reqUTC>
        <sd:resUTC>2007/12/10 12:05:12.000</sd:resUTC>
        <sd:metrics dp="sd" tp="t0" c="1|0"/>
        <sd:metrics dp="dp1" tp="t1" c="1|0"/>
        ...
        <sd:metrics dp="dpn" tp="t1" c="1|0"/>
    </sd:servicedata>
```

-continued

```
    <sd:content>
        <object xmlns:providernamespace1="uri://credit-
        suisse.com/ProviderRoot1/Year/Name"
        xmlns:providernamespace2="uri://credit-
        suisse.com/ProviderRoot2/Year/Name">
            <providernamespace1:elem1></providernamespace1:elem1>
            ...
            <providernamespace2:elem1></providernamespace2:elem1>
            ...
            <providernamespace1:elem2></providernamespace1:elem2>
            ...
            <providernamespace2:elem2></providernamespace2:elem2>
            ...
        </object>
    </sd:content>
</sd:response>
```

An exemplary schema definition can be seen below:

```
<?xml version="1.0" encoding="utf-8"?>
<xs:schema    xmlns:sd="uri://credit-suisse.com/sd/2008/cs-universe"
attributeFormDefault="unqualified"    elementFormDefault=
"qualified" targetNamespace="uri://credit-suisse.com/sd/2008/
cs-universe"
xmlns:xs="http://www.w3.org/2001/XMLSchema">
    <xs:element name="response">
        <xs:complexType>
            <xs:sequence>
                <xs:element name="servicedata" maxOccurs="1"
                minOccurs="0">
                    <xs:complexType>
                        <xs:sequence>
                            <xs:element name="reqUTC" type="xs:dateTime" />
                            <xs:element name="resUTC" type="xs:dateTime" />
                            <xs:element name="metrics">
                                <xs:complexType>
                                    <xs:attribute name="dp" type="xs:string" use=
                                    "required" />
                                    <xs:attribute name="tp" type="xs:unsignedByte" use=
                                    "required" />
                                    <xs:attribute name="c" type="xs:boolean" use=
                                    "required" />
                                    <xs:attribute name="req" type="xs:dateTime" use=
                                    "required" />
                                    <xs:attribute name="res" type="xs:dateTime" use=
                                    "required" />
                                </xs:complexType>
                            </xs:element>
                        </xs:sequence>
                    </xs:complexType>
                </xs:element>
                <xs:element name="content" />
            </xs:sequence>
            <xs:attribute name="id" type="xs:string" use="required" />
        </xs:complexType>
    </xs:element>
</xs:schema>
```

Various embodiments of the invention may utilize a service data namespace responsible for defining the structure of the response document element and the access control and service performance elements. In some embodiments, the content child nodes can have any number of namespaces. The name spaces may refer to the data providers contributing to the query result. Internal and external namespaces can be used. In some embodiments, internal and external namespaces can only be used if they do not collide.

Various embodiments of the invention allow the attributes defined above to be extended as required. The table below provides exemplary definitions for the elements.

TABLE 1

Exemplary Service Data Schema

| Element | Description | Data Type | Permitted Value(s) |
|---|---|---|---|
| req | UTC time request received format: yyyy/mm/dd hh:mm:ss.nnn | xs:dateTime | Any |
| res | time request returned format: yyyy/mm/dd hh:mm:ss.nnn | xs:dateTime | Any |
| metrics | Response time of the root server service plus any data providers interrogated to provide the answer | — | See attributes |
| metrics@dp | Data provider namespace provided with the request - sd for the root service | xs:string | Any |
| metrics@tp | Throughput time for the data provider to complete the response requested | xs:unsignedByte | Value in seconds |
| metrics@c | Whether the data provider namespace returned a complete response within the max query time specified in the request or not | xs:boolean | 1 or 0 (zero) |

Various embodiments of the invention may combine the service data provider response time and root service processing time to provide the total response time for the request. The total response time may be broken into the component response times for the different contributing data provider requests and compilation by the root server service in the following algorithm:

$$T_r = T_{sd} + \max(T_{dp_i})$$

wherein $T_r$ is the total response time in decimal seconds; $T_{sd}$ is the time between receiving the request by root service plus compilation time once namespace requests received in decimal seconds; and $T_{dp_i}$ is the time taken to complete each namespace request and response back to the root service in decimal seconds.

In some embodiments, the object data structure may be specified in the System.Systemclasses interface, which can be queried. Exemplary syntax for querying the system class interface is:

?q=System.SystemClasses

In some embodiments, the system class may define the possible attributes for all class members. Additionally, the system class may define the mandatory attributes returned with a collection. Running the query as defined above may return all class members across all data providers. In some embodiments, each specific class member may then be further discovered using the following syntax to return the member class:

?q=System.SystemClasses.Item("name of the system class member")

and to return the class member attributes:

?q=System.SystemClassesItem("name of the system class member").ClassMembers.Item("member name")

Table 2 provides exemplary definitions of the constructs that may be required to build the serialized output from the data provider.

TABLE 2

Exemplary Class Members and Definitions

| Element | Description | Data Type | Permitted Value(s) |
|---|---|---|---|
| Object | The root node for the serialized object. | Of Object | One of the class names or a primitive data type |
| Xmlns:dpn | Namespace declarations of the data providers queried to retrieve the object | Xml Namespace | A URL that uniquely identifies the registered data provider |
| Object@q | Query used to retrieve the object | xs:string | UTF-8 |
| Object@id | The actual query that should be used to retrieve the object | xs:string | UTF-8 |
| Object@timestamp | UTC based timestamp specifying the time the xml node was generated | xs:dateTime | UTF-8 |

TABLE 2-continued

Exemplary Class Members and Definitions

| Element | Description | Data Type | Permitted Value(s) |
|---|---|---|---|
| Object/dp1:* | A member of an object serialized. The node name specifies the member serialized (i.e.: Computer/oc: Name would mean Computer Object's Name property according to data provider oc) | — | Object's each sub node value is subject to restrictions specified in the related schema documents. |
| Object/dp1:*/@id | If a member of an object can be further discovered, the link to discover this object is specified in the id attribute of the sub node | xs:string | A query that is in the format of Root Construct |

In some embodiments, the system classes collection may include a list of classes exposed by the sum of data providers presented directly through the root web service. The system classes collection also may define attributes which all collections return, as illustrated below:

TABLE 3

Exemplary System Classes Collection

| Element | Description | Data Type | Permitted Value(s) |
|---|---|---|---|
| Count | Number of items returned in the collection | xs:long | ≥0 |

TABLE 3-continued

Exemplary System Classes Collection

| Element | Description | Data Type | Permitted Value(s) |
|---|---|---|---|
| Image | Icon to be used for class | xs:string | UTF-8 |
| Name | Class Descriptive Name | xs:string | UTF-8 |

In various embodiments, System Class attributes may define several core properties that help the root web service correctly handle the child elements. In addition, the several core properties that may be defined by the System Class attributes may help user interface developers build logic free solutions. Exemplary definitions are provided in Table 4 below:

TABLE 4

Exemplary System Classes Collection

| Element | Description | Data Type | Permitted Value(s) |
|---|---|---|---|
| Access | Availability of the class to requestors | xs:string | Public, private |
| AutoRefresh | Suggested re-query period - 5 is set as a throttle | xs:long | 5 ≤ refresh ≤ f(provider) |
| Cache | Period in seconds to cache class member - setting to zero (0) means no caching | xs:integer | Cache ≥ 0 |
| ClassMembers@id | Link to class members | xs:string | UTF-8 |
| Collection | Is a collection | xs:boolean | Implicit |
| Name | Name of class | xs:string | UTF-8 |
| ValidViewTypes | Defines a bit mask to help user interface developers understand whether the data can be rendered as a chart, map, table image, and/or any one of the above listed formats or an unlisted format | xs:integer | 1 - table<br>2 - chart<br>4 - map<br>8 - image<br>16 - etc . . . |
| IsSearchable | Defines whether the data provider has identified the attribute as searchable. May help user interface developers to build lists of attributes which are commonly searched. | xs:boolean | UTF-8 |

In some embodiments, the system class member may inherit System Classes.

Various embodiments of the invention may employ System Class Member Attributes which may inherit System Class attributes and extend them to also set additional attributes. Exemplary attribute definitions are below in Table 5:

TABLE 5

Exemplary System Class Member Attributes

| Element | Description | Data Type | Permitted Value(s) |
| --- | --- | --- | --- |
| DataType | Type of the member. | xs:string | A primitive data type or name of a class |
| DefaultDisplayProperty | Denotes whether this property should be used as the 'caption' to display | xs:boolean | 0-Member should not be used as caption<br>1-Member should be used as caption |
| Display | Flag suggesting whether to display the member in GUI | xs:boolean | 0-Do not display member in GUI<br>1-Display member in GUI |
| DisplayName | The user friendly name of the member when displaying | xs:string | UTF-8 |
| MemberType | Object oriented relationship of the member to its class | xs:integer | 0-Property<br>1-Sub<br>2-Function<br>3-Event |
| Name | Name of the member | xs:string | UTF-8 |
| Parameters/@id | Pointer to the list of parameters required to pass in the query to get/set the member | xs:string | "Nothing"-no parameters required OR UTF-8 |
| Relation | Logical relationship of the member to its class | xs:integer | 0-ID<br>1-Attribute<br>2-Method<br>3-Child<br>4-Parent |
| Setable | Flag indicating whether this member can be set (writable) | xs:boolean | 0-Not setable<br>1-Setable |
| SystemClass | Pointer parent class | xs:string | UTF-8 |

In some embodiments, the system class member parameters may inherit System Class Members. Exemplary System Class Member Parameter Attributes are below in Table 6:

TABLE 6

Exemplary System Class Member Parameter Attributes

| Element | Description | Data Type | Permitted Value(s) |
| --- | --- | --- | --- |
| DataType | Type of the member parameter. | xs:string | A primitive data type or name of a class |
| DefaultValue | Default value for the parameter if it is omitted | xs:string | UTF-8 (Also, has to comply with the DataType specification) |
| ID | Name of the parameter | xs:string | UTF-8 |
| IsOptional | Value for flagging whether this parameter is optional | xs:boolean | 0-The parameter has to be passed<br>1-The parameter can be omitted and the default value will be used |

TABLE 6-continued

Exemplary System Class Member Parameter Attributes

| Element | Description | Data Type | Permitted Value(s) |
| --- | --- | --- | --- |
| Name | Name of the member parameter | xs:string | UTF-8 |
| SystemClass@id | Pointer to the class of the parent member | xs:string | UTF-8 |
| SystemClassMember@id | Pointer to the class member of this parameter | xs:string | UTF-8 |

Various embodiments of the invention employ functions that can be applied to an object which may be serialized. These functions may operate in the context of the requestor. In some embodiments, these functions may require their own authorization control decision set because these functions may write data as well as read data. In some embodiments, the available list of functions for a given object may be enumerated by executing the following query:
?q=System.SystemClasses.Item("class name").ClassMembers.Filter("MemberType", "=", "2")
A function call may be constructed with no arguments from the result set of the previous query. For example, with a computer object, a function could be defined as follows:
?q=Computer("{ID}").CollectSoftwareInventory
Various embodiments of the invention may use a function call with arguments, for example:
?q=MyObjectClass("{ID}").MyTask("mytasksetting"," ", True,0,True,False)
In some embodiments, the ability to provide a function call with arguments may provide custom functions. According the various embodiments of the invention, in order to construct the function call above, the parameter list required by the function 'MyTask' may be retrieved by executing the query having syntax as illustrated below:
?q=System.SystemClasses.Item("MyObjectClass").ClassMembers.Item("MyTask").Parameters
In some embodiments, the parameter specification can be gathered using the following query per task:
?q=System.SystemClasses.Item("MyObjectClass").ClassMembersItem("MyTask").Parameters.Item("mytasksetting")
Various embodiments of the invention may contain version control for the release of the root service with the System object. In some embodiments, the version may be exposed by using the root construct:
?q.System.Version
The construct may be formed to take no arguments. The version returned may use the following format, for example:
MajorVersion.MinorVersion.ProviderRevision
In some embodiments, the provider revision may be incremented whenever a new data provider is added or a property is changed. The Minor Version may be incremented whenever new object functions or root service methods are added. The Major Version may be incremented when changes to the root service engine are deployed. In some embodiments, incrementing the provider revision may be employed to force the response cache to be purged.

Various embodiments of the invention may provide a method for determining the operating context of the requestor, which may include the user's location, device, and identity. The user's operating context may be determined without user input. In some embodiments, the invention may include the ability of a server-side processor to receive user context information and make an authorization decision for the requested data. The server-side processor may provide a time-limited web service access request token if the user making the request satisfies necessary user context requirements.

Conventionally, a REST web service will return a response to any requestor. An enterprise may desire to manage distribution of federated data sources so that the access control of the source data provider is maintained. These opposing constructs present a juxtaposition which may pose problems if not solved for a REST web service to operate in an enterprise context. Various embodiments of the invention employ an overall process flow to determine user context, which may include, but are not limited to: user location, which may include returning internal versus external and a latitude/longitude coordinate; user access terminal or device, which may include a determination of whether the user access terminal or device is a computer supplied by the enterprise or another device; and/or user identification, which may include determining if the user is a registered consumer and/or employee and, if an employee, what kind of employee.

In some embodiments, the invention may provide user context services, employing consumer telemetry to drive configuration, entitlements, and/or user context access permissions. Consumer telemetry may include information not limited to user name, user identification, user account log-on, user employee type, user employee department, user job description, user standard workplace jurisdiction, user current workplace jurisdiction, user access terminal or device name, user access terminal or device network address, user access terminal or device browser security level, user access terminal or device connection type, user access terminal or device browser language, user access terminal or device location, user access terminal or device identification, type of user access terminal or device, type of user access network, user access network security, or any combination thereof. Some embodiments of the invention may transmit consumer telemetry data in an encrypted format. Consumer telemetry data may be transmitted before a request to access or query an application, data source, or other data. Upon processing consumer telemetry data, the system may be operable to select services, widget lists, and/or data to be displayed based on user context. The enumerated decision points are examples. Additional questions could be posed if required.

In various embodiments of the invention, a resource, such as data, a data string, data source, application, or other data resource, itself may be operable to provide user context based access control. For example, upon receiving a request to query a resource, the resource may compare transmitted user telemetry data to codified user context permission levels to determine appropriate access permissions. The resource may then allow or deny access or queries in whole or in part based on a user's access permissions. Providing end user access control may provide an enterprise protection from a contravention of enterprise policy or potential action.

For example, in some embodiments, the location of the requestor, requesting device context and requestor identity may work in triplicate from the end point context. The end point may be used to overcome many different requestor scenarios. The process of decision making may be in two parts: (1) initial request to confirm a consumer context and (2) subsequent per data service query requests to validate context may remain active. A logical architecture for the complete context service is illustrated in FIG. 9B. As illustrated in FIG. 9B, a name space 94 may define user access scope 98 for limiting access based on user context information. A data scope aggregator 97 may include and/or store user access scope definitions 98 for the one or more name spaces 94. If a requestor 90 attempts to connect to, access, and/or query a root web service 91, the root web service 91 may employ a decision engine 96 to determine the scope of access permitted based on obtained user context information.

Simple object access protocol (SOAP) provides methods for HTTP POST-based access control. Many server-side development platforms support credential bound connections. These methods may be adequate in a one-to-one exchange, but may not be adequate for one-to-many exchanges through a root service, where a requestor can query multiple downstream data sources. Some conventional downstream data sources may have restrictions in place which limits requestor access if the requestor is not in a specific location or using a specific device or connection. Various embodiments of the invention include a mechanism for REST-based access control and context management to identify a requestor's operating context. In some embodiments, the access control and context management may confirm the requestor's operating context against an authorization matrix per data provider to determine whether the current context should be authorized to retrieve data from the provider.

Conventional systems may employ two- or three-factor authorization mechanisms to confirm identity and device context, but may not account for location. However, in certain situations, requestor location may be as important as requestor identity or device. Various embodiments of the current invention make a more holistic decision about whether to grant access to a resource. In some embodiments, the invention may extend traditional authorization mechanisms and provide N factor authorization, where N is the choice of the data provider. Various embodiments may consider requestor identity, requestor device, and requestor location in comparison with the requestor's contracted workplace combine to provide a three-factor decision.

In some embodiments, the requestor's identity may be partially confirmed by device logon—which may precede the request. Various embodiments of the invention may complete one or more additional steps without input. In some embodiments, the invention may provide additional security by accepting only corroborated positive responses.

In some embodiments, ensuring that a requestor has logged onto a device may comprise a first step for confirmation of identity for the root service to obtain the remote user from the HTTP headers. In some embodiments, the root service may have access to a staff directory and authentication service for automatically confirming whether the requesting logon is active and belonging to the requestor. Conventionally, many large enterprises may have joiner/leaver processes. Various embodiments of the invention may interact with the joiner/leaver process to make a decision. In some embodiments, active employees may meet one or more of the following criteria: has an enabled computer username; has a matching employee ID in the Human Resources System; has an email address; has sent an email in the last 30 days; has a desk location registered with building services; and/or has previously logged onto the device in use in the current context.

Various embodiments of the invention may confirm a requestor's identity if one or more of the foregoing elements have been satisfied. However, this approach may be unable to determine identity if a password has been shared or inappropriately obtained. In some embodiments, the current invention may additionally include biometric testing to further confirm requestor identity.

Various embodiments of the invention anticipate circumstances in which the requestor is a machine rather than a human. In some embodiments, the invention may assign a requestor ID based upon a previous client check and application process. In this instance, a machine may provide its ID with all such requests. The ID may be an encrypted string which may identify key parameters about the requestor which may be separately verified. For example, key parameters may include one or more of the machine's internet protocol (IP) address, hostname, and/or referring URL. In some embodiments, key parameters may be matched with an internal register. Various embodiments of the invention may execute a trace route back to the device and/or complete a DNS lookup to match the IP address, hostname and network location. If the IP address, hostname and/or URL changes or is otherwise incorrect, a request can be denied.

Various embodiments of the invention may also consider the type and identity of the requestor's device when making permissioning decisions. In some embodiments, the invention may have the capability to distinguish between devices which are virus protected and/or patch current and those which are not when granting access to a data source.

In some embodiments, the current invention may consider client side browser navigator properties and received HTTP headers to obtain some information about the device context of the received request: Conventionally, this data does not provide a robust confirmation of device identity. To properly confirm device identity, the service may obtain the local IP Address and/or device name and use that and/or other data to confirm the device context using a separately collected repository. Determining local IP Address and hostname may be operating system (OS) or device specific tasks. In some embodiments, one or more methods may be tried in sequence, wherein many of the necessary methods are provided by conventional operating systems.

Requestor location may be important for a number of reasons, including the ability to provide geographically driven contextual services. In some instances, the country in which the requestor currently operates may impact legal, political and/or operational concerns of the data sources. For example, applicable laws may prohibit access to data from outside a specified country's borders under certain conditions. Conventionally, determining location from well inside a country's borders is a trivial problem using GPS and/or a known wireless fidelity (Wi-Fi) hotspot. Location may also be determined using the requestor's IP address on the internal network and/or external networks if network masking and proxy address recasting are overcome. Conventional systems are less adept at determining the situs of the device when the requestor is near to a country's borders. Near borders, the requirement for accuracy increases while often placing the burden on the consuming service to correctly know the location of the boundary itself.

Various embodiments of the invention anticipate the use of a number of telemetry methodologies, depending upon accuracy required, environment, and the mobility of the operator. The table below provides a brief synopsis of the strengths, weaknesses, and other factors relevant to several exemplary telemetry methodologies based upon common, publicly available data:

TABLE 7

Geolocation Services Solution Summary

| Service | Accuracy | Sources of Error | Use Cases | Investments |
|---|---|---|---|---|
| GPS | 5 satellite triangulation error <10 m | Too few satellites Signal distortion Clock deviation Rapid position change | Any enabled device Open sky access | Enablement Software Training |
| Wi-Fi | <5 m to previously located hotspot, 9 m to 15 m for open triangulation | >10 m range Bad reference locations Poor signal strength Background clutter No line of sight | Any enabled device Public hotspot location Internal conference rooms | Public dataset Internal dataset Initial infrastructure Lifecycle Mgt. Service Support |
| IPAddress | Country level most accurate, street level possible | Network segmentation Subnet reallocation Bad reference data | Any networked device | Internet solution Topology discovery Training |
| RFID | 7 m line of sight maximum | Tag can be removed Poor signal reception No line of sight Tag shielding Incorrect tag placement | Any enabled device Inventory Mgt Entry/Exit scanning | Infrastructure CMDB Training Initial scan Enforcement |

Considering the strengths and weaknesses of publicly available telemetry methodologies, in some embodiments, the current invention may employ use cases as illustrated in the table below:

TABLE 8

Exemplary Geolocation Services Device Solution Matrix

| Device | Use Case | 1$^{st}$ Pick Method | 2$^{nd}$ Pick Method |
|---|---|---|---|
| Corporate Desktop | Intranet location Internet location | Internal IP Address External IP Address | None Internal IP Address |
| Personal Desktop | Internet location | External IP Address | Wi-Fi |
| Corporate Laptop | Intranet location Internet location | Internal IP Address External IP Address | Wi-Fi Wi-Fi |
| Corporate Handheld | Intranet location Internet location | GPS GPS | None None |
| Personal Communicator | Intranet location Internet location | GPS GPS | None None |

Various embodiments of the invention may solve the problem of location near to a country boundary using a data set which defines the country boundary to have the two nearest points defined within the resolution required to correctly determine location. For example, to correctly locate a consumer within ten meters of a country boundary requires the country boundary to be known to at least five meter intervals. To define a small country boundary to five meters resolution may require over four million data points, a data set that is too large for many conventional applications. In some embodiments, the current invention may map to 30 meter intervals with an implied probability that the points in the dataset coincide with the physical boundary.

In some embodiments, it may be desirable to consider only the points within a country's borders not including the margins of error to safely determine location near a boundary. In some embodiments, the current invention may use the following methodology to determine the requestor's geographic location:

1) A polygon of n sides of length s has area A defined by the following formula:

$$A = \frac{n}{4}s^2 \cot\frac{\Pi}{n}$$

Solving n for a given s and A is an inverse problem that may be easily solved.

2) The probability p that the polygon fits the country boundary is therefore derived as $$p = \sum_i \left( \frac{\left(1 - \left(\frac{s_i}{2s_i + x_i}\right)\right)}{n} \right),$$

where x is the distance of each physical point from a point in the data set of sides of length s and total number of sides i from 1 to n.

3) The distance between two points on a sphere is reliably defined by the Vincenty formula for point$_1$ with latitude/longitude lat$_1$/long$_1$ and point$_2$ with latitude/longitude lat$_2$/long$_2$ as follows:

$$d_v = \alpha \cos(\sin(lat_1) \cdot \sin(lat_2) + \cos(lat_1) \cdot \cos(lat_2) \cdot \cos(long_2 - long_1) \cdot R$$

Various embodiments of the invention may minimize this calculation against each of the 10 nearest boundary dataset points to provide the nearest point in the dataset to the location returned by the device location service.

4) The steps 1 through 4 combine to provide a solution where the distance from the boundary to be within boundary and device error E is defined by:

$$D = \left(\frac{d_v + E}{p}\right)$$

5) For example, an open Wi-Fi device may have an error of 115 meters (E). If the country boundary fit probability is, for example, 0.7, a person could only be reliably located within the chosen boundary if they were more than 164 meters inside the boundary. Thus, for this example, an openly located consumer identifying themselves as within 164 meters of the country boundary should not be accepted as inside the country boundary.

Various embodiments of the invention may utilize a combination of solutions which easily locate consumers well inside a country boundary and a solution for determining location close to the country boundary to provide full geolocation services. In some embodiments, geolocation services may provide country-based access control decision-making for enterprise systems.

Accuracy may depend significantly on the location service used and the context in which it is used. One degree (1°) of latitude covers a distance of approximately 111 kilometers at the equator. Unless the requestor is exactly on the degree mark, the precision of the geolocation services implies rounding to further decimal places. If rounding is done, the margin of error is half the maximum resolution distance for the decimal place provided. As an example, it is possible to create a table of the distance resolution provided by each decimal place precision of a returned latitude coordinate, assuming accuracy of the latitude measurement:

TABLE 9

Degree Distance Decimal Precision

| Decimal Places | Example | Earth Resolution | Data Type/Size |
|---|---|---|---|
| 0 | 180° | 55,500 m | Signed Long/8 bytes |
| 1 | 180.1° | 5,550 m | Single Precision Float/ 4 bytes |
| 2 | 180.12° | 555 m | |
| 3 | 180.123° | 5.55 m | |
| 4 | 180.1234° | .555 m | |

In some embodiments, a server-side request context may provide the root service's view of the information submitted by the client user context and HTTP headers that were provided with the request. The request context may be created per request. For example, in some embodiments, different data providers and classes can be requested per request, each requiring an access control decision. In various embodiments, the request context may not be exposed in the query response, but instead exposed through its own interface as illustrated below:
RootService?q=Infrastructure.RequestContext
In some embodiments, a response such as is illustrated below may be returned, with the element content replaced with what the element represents:

```
<?xml version="1.0" encdding="UTF-8" ?>
<sd:response xmlns:sd="uri://credit-suisse.com/sd/2008/cs-universe"
  id="{75B66D26-1BE6-428F-96BE-B05094A1C8A7}">
  <sd:content>
    <RequestContext xmlns:oc="uri://credit-
    suisse.com/tis/2008/OmniConsole" timestamp="2008/06/04
    19:08:14.588" id="RequestContext("{75B66D26-1BE6-428F-
    96BE-B05094A1C8A7}")" q="Infrastructure.requestContext">
        <oc:AuthorizationToken>myauthenticationtoken<oc:
AuthorizationToken>
      <oc:AuthorizedUser>usermakingrequest</oc:AuthorizedUser>
      <oc:CreationTimeUTC>2008/06/06
      12:09:35.423</oc:CreationTimeUTC>
      <oc:DataProvidersQueried />
      <oc:ID>{C712FC24-A3E5-4C8E-92AA-DE73C159E06E}
      </oc:ID><oc:LocalHostAddress>Ip Address of Root
      Service</oc:LocalHostAddress>
      <oc:LocalHostName>HostName of Root
      Service</oc:LocalHostName>
      <oc:LogonUser>Device Logon Context UserName
      </oc:LogonUser>
      <oc:ProtocolUsed>http</oc:ProtocolUsed>
      <oc:ProxyByPassed>0|1</oc:ProxyByPassed>
      <oc:Query>Infrastructure.requestContext</oc:Query>
      <oc:RemoteHostAddress>IP of requesting
      Client</oc:RemoteHostAddress>
      <oc:RemoteHostName>Hostname of requesting
      Client</oc:RemoteHostName>
      <oc:RequestorID>{48586F68-DD2D-408C-B700-
      A79389C20C7B}</oc:RequestorID>
      <oc:ResponseCachePopulated>0|1
      </oc:ResponseCachePopulated>
      <oc:ResponseCacheUsed>0|1</oc:ResponseCacheUsed>
    </RequestContext>
  </sd:content>
</sd:response>
```

In some embodiments, the request object may have one additional method:
RootService?q=Infrastructure.RequestContext.ResolveLocation
This method may determine if the remote host IP address is external or internal and may provide the associated latitude and longitude. In some embodiments, if the client context used a "requestorID" through an intermediate application service and the remote address was supplied to this application service, the method may (1) override the remote address identified by the server and (2) preserve client details through address recasting that proxies may be capable of doing to HTTP request source addresses.

Various embodiments of the invention may employ an access control decision processor. In some embodiments, the access control decision processor may consume an XML decision tree which has been produced from the access control requirements set by the data provider. The decision tree may be comprised of one or more of the following elements: (1) a document element specifying the logical operator that applies to the decision rules; (2) N Child Node Decision Elements, which may include rules to process; (3) a "MemberPath" parameter to evaluate; (4) an "Operand" parameter signifying the conditional test to perform; and (5) a "Value" parameter which may be tested to determine a Request Parameter match.

In some embodiments, the document element may support at least AND, OR, and/or NOT operators. Various embodiments of the invention may process the decision element child nodes in the order they are serialized. In some embodiments, the Decision Element Operands can be any of the operands supported by the query interface. In some embodiments, after a decision element evaluates to false, the code may exit the decision tree and report that the access control decision overall has failed. Various embodiments of the invention may provide the capability to test any element in the RequestContext in the decision tree. In some embodiments of the invention, if the Authorized user or RemoteIPAddress are known to the framework, the framework can use the discoverable properties of the Authorized user or RemoteIPAddress as conditions in their own right. For example, this process may be accomplished using code as illustrated below:

```
<or>
    <DecisionElement>
        <MemberPath>this.RequestContext.AuthorizedUser.Login
        </MemberPath><Operand>=</Operand>
        <Value>username1</Value>
    </DecisionElement>
    <DecisionElement>
        <MemberPath>this.RequestContext.AuthorizedUser.Login
        </ MemberPath><Operand>=</Operand>
        <Value>username2</Value>
    </DecisionElement>
    <DecisionElement>
        <MemberPath>this.RequestContext.AuthorizedUser.Employee.
Location.Name</MemberPath>
        <Operand>regex</Operand>
        <Value>MyLocation</Value>
    </DecisionElement>
    <DecisionElement>
        <MemberPath>this.RequestContext.AuthorizedUser.Employee.
Department.Name</MemberPath>
        <Operand>regex</Operand>
        <Value>/ MyDepartment$/</Value>
        </DecisionElement>
</or>
```

In the above illustration, different conditions, including direct and derived conditions, are used. In addition, the above example demonstrates use of some of the operands supported by the query interface. Various embodiments of the invention may identify acceptable context scopes in which to return data to the requestor by answering a set of questions which define the different user contexts in which requests are accepted or rejected via an on-boarding process. The level of granularity may be per data provider or per data element returned per data provider. The schema definition for the data provider may include the ability to set data to be returned and displayed through the system class member parameters.

Figure 10:
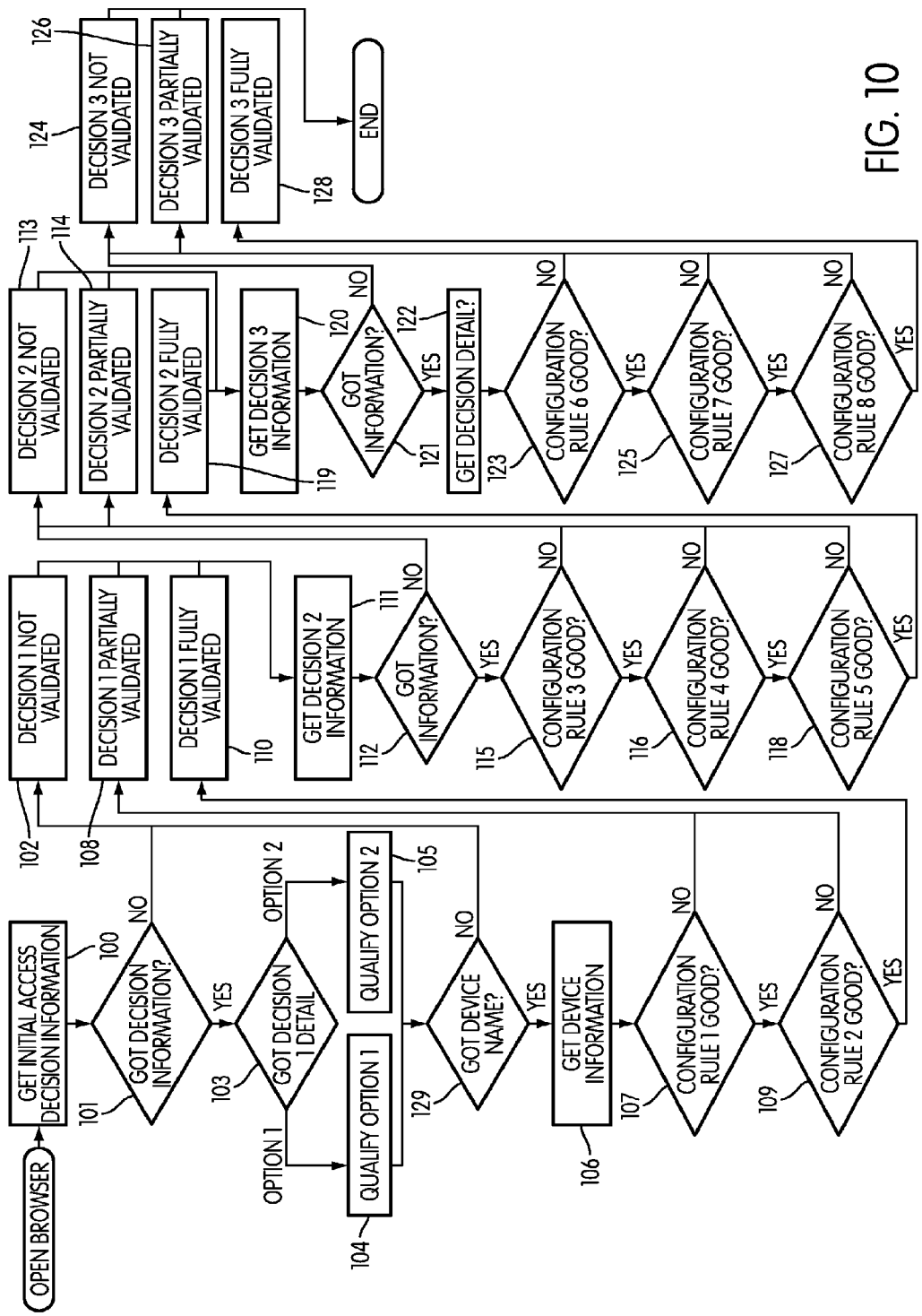
FIG. 10 is a flow diagram of a method for providing user context based access to a web service and/or application in accordance with various embodiments of the invention.

Various embodiments of the invention may employ a process to employ user context services, as illustrated in FIG. 10. FIG. 10 illustrates an exemplary method for validating decision information which may be used in some embodiments. Upon a request to access a secured environment, such as a web service, data source, markup language web page, or other secured environment, a user context validation system may obtain initial access decision information 100 from the browser or GUI displaying the secured environment. The user context validation system may ensure that first decision information has been obtained 101. If the first decision information has not been obtained 101, the user context validation system may record data indicating that a first decision was not validated 102, as illustrated in FIG. 10. If decision information has been obtained 101, the user context validation system may then qualify one or more options 104/105. The user context validation system may determine if a device name was obtained 129. If a device name was not obtained 129, the user context validation system may record data indicating that the first decision was not validated 102, as illustrated in FIG. 10. If a device name was obtained, the user context validation system may retrieve device information for the device 106. The user context validation system may determine if a first configuration rule is good 107. If the first configuration rule is not good 107, the user context validation system may record data indicating that the first decision was partially validated 108. If first configuration rule is good 107, the user context validation system may determine if a second configuration rule is good 109. If the second configuration rule is not good 109, the user context validation system may record data indicating that the device location was partially validated 108. If the second configuration rule is good, the user context validation system may record data indicating that the first decision was fully validated 110.

Various embodiments of the invention may employ a second decision validation method as illustrated in FIG. 10. A user context validation system may validate the second decision by obtaining second decision information 111. If no second decision information is received 112, the user context validation system may record data indicating that the second decision was not validated 113. If second decision information was received 112, the user context validation system may determine whether a third configuration rule is good 115. If the third configuration rule is not good 115, the user context validation system may record data indicating that the second decision was not validated 113 or partially validated 114. If the third configuration rule is good 115, the user context validation system may determine if a fourth configuration rule is good 116. If the fourth configuration rule is not good 116, the user context validation system may record data indicating that the second decision was not validated 113 or partially validated 114. If the fourth configuration rule is good 116, the user context validation system may determine if a fifth configuration rule is good 118. If the fifth configuration rule is not good 118, the user context validation system may record data indicating that the second decision was not validated 113 or partially validated 114. If the fifth configuration rule is good 118, the user context validation system may record data indicating that the second decision was fully validated 119.

In some embodiments, the invention may utilize a third validation method as illustrated in FIG. 10. A user context validation system may validate a third decision by obtaining third decision information 120. If the third decision information is not obtained 121, the user context validation system may record data indicating that the third decision was not validated 124. If the third decision information is obtained 121, the user context validation system may obtain third decision detail 122. If a sixth configuration rule is not good 123, the user context validation system may record data indicating that the third decision was not validated 124 or partially validated 126. If the sixth configuration rule is good 123, the user context validation system may determine if a seventh configuration rule is good 125. If the seventh configuration rule is not good 125, the user context validation system may record data indicating that the third decision was not validated 124 or partially validated 126. If the seventh configuration rule is good 125, the user context validation system may determine if an eighth configuration rule is good 127. If the eighth configuration rule is not good 127, the user context validation system may record data indicating that the third decision was not validated 124 or partially validated 126. If the eighth configuration rule is good 127, the user context validation system may record data indicating that the third decision was fully validated 128.

Figure 13:
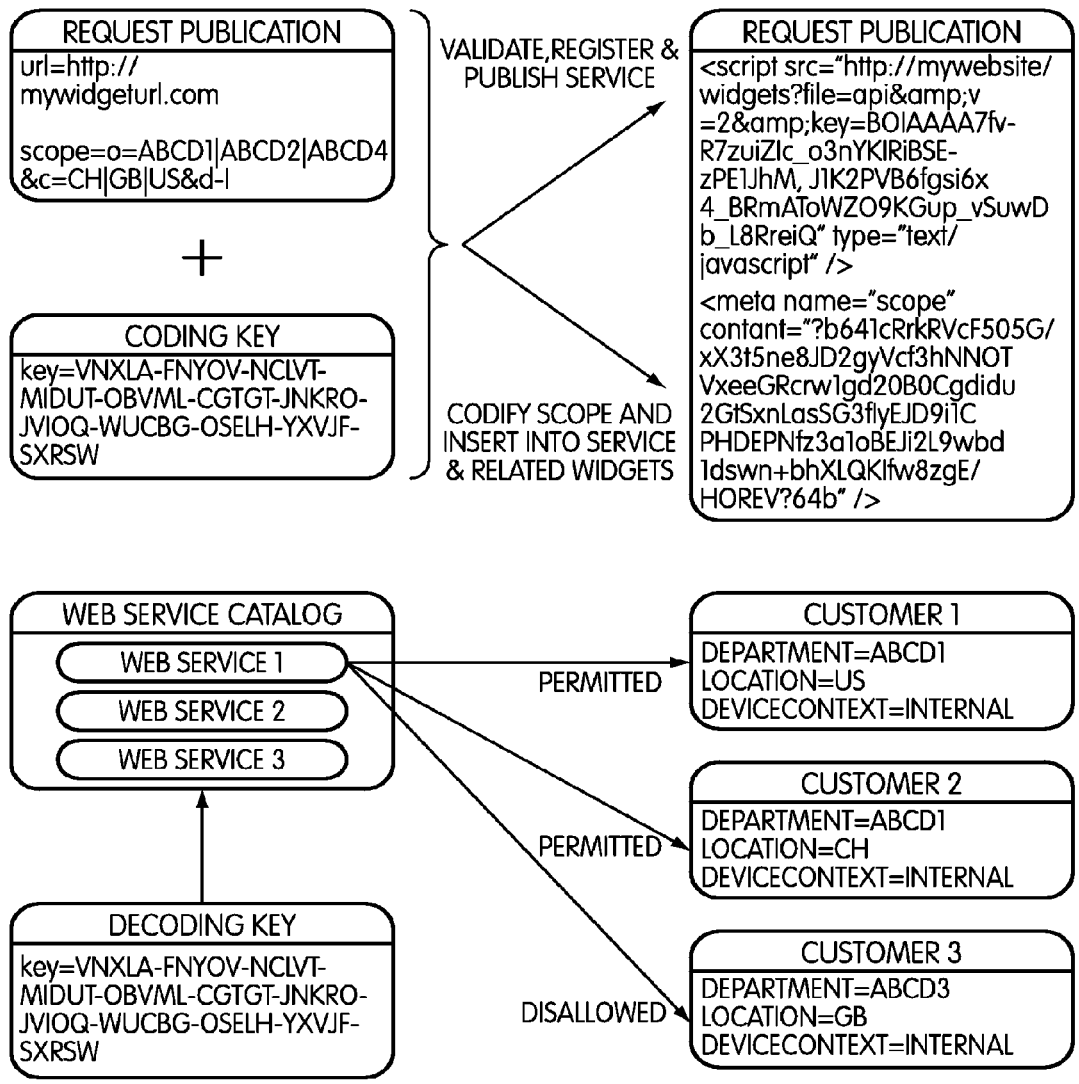
FIG. 13 is a block and flow diagram illustrating access and/or distribution control of a data source or application in accordance with various embodiments of the invention.

Various embodiments of the invention may use coding and decoding keys to perform user context validation, as illustrated in FIG. 13. A web service or data source 190 may have a coding key 191 including scope and access limitations codified and inserted before the web service or data source is validated, registered and published. A decoding key 192 may then be transmitted by a user access terminal or device. If the decoding key 192 properly matches the coding key 191 for the web service or data source 190, the user access terminal or device 193 may be permitted to perform the search query. If the decoding key 192 does not match the coding key 191 for the web service or data source 190, the user terminal 193 may be disallowed from performing the search query.

It may not be desirable to return the permitted user contexts in plain text because returning the permitted user contexts in plain text may encourage a requestor to pretend to be the required context. In some embodiments the invention may encrypt the complete returned result. The invention may not encrypt the entire serialized result. In some embodiments, the invention may codify the permitted user contexts using a per data provider key. Various embodiments of the invention may codify per server based requestors because server based requests may not have many of the same data points that permit the ratification of a human's operating context. Computer based requests may be specifically registered in addition to confirming the decision points that are available to validate per request interaction with the root web service.

Figure 15:
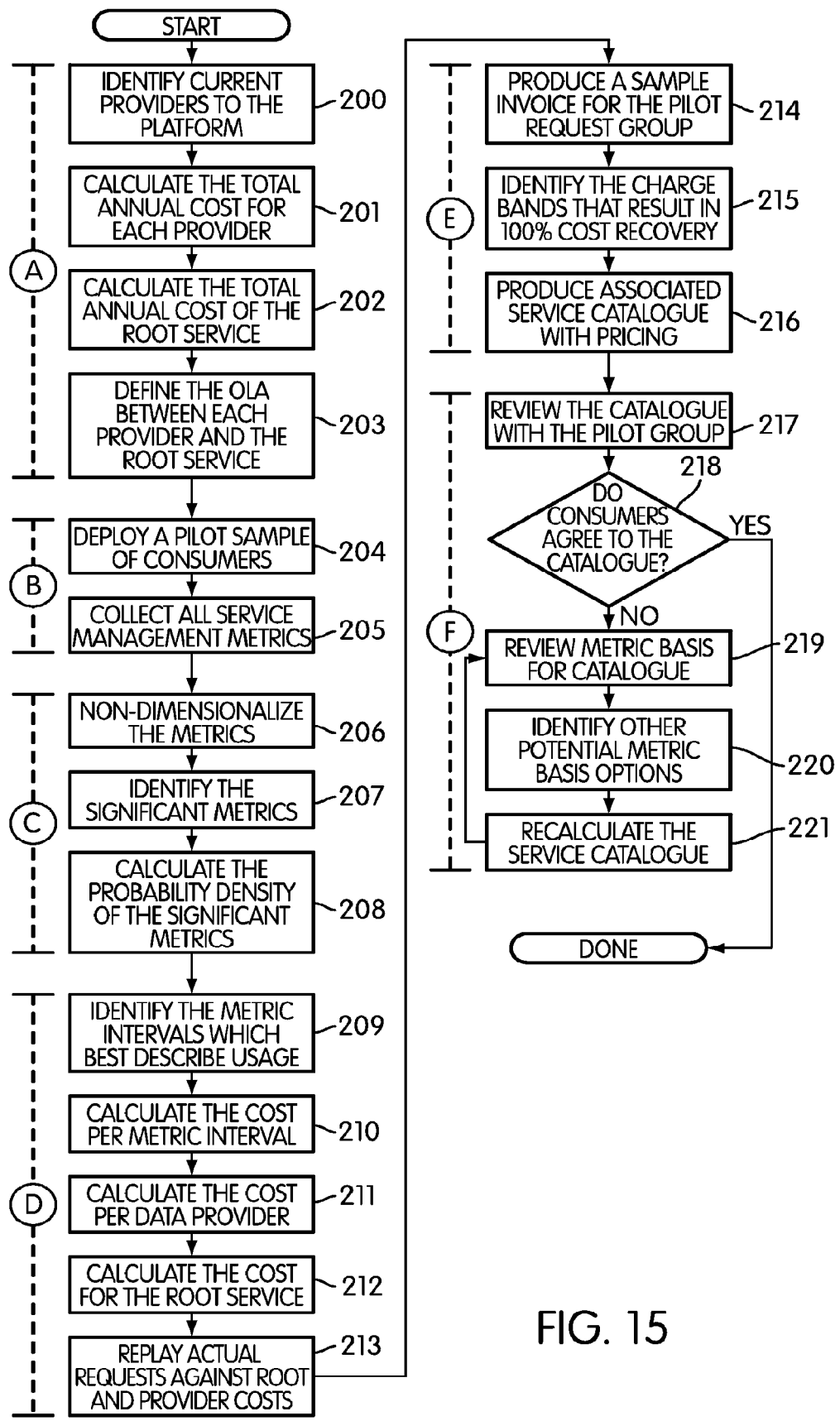
FIG. 15 is a flow diagram of a method for costing a root web service in accordance with various embodiments of the invention.

In some embodiments, the invention may provide a set of standards and methods for wrapping service management around the request and retrieval of data through distributed web data services so that they can be metered and therefore able to have an SLA. Various embodiments of the invention provide a method of managing lifecycle investment and utilization based cost recovery for distributed web data services necessary for financial management of the platform root service as illustrated in FIG. 15. Some embodiments of the invention may provide federation of chargeback through to data providers.

Web services in the enterprise context may require metering in order that they can be both service level managed and also costed and recovered as a function of use. The consumer internet does not generally need to provide the same service management back to the consumer because service level may be indemnified in the terms of use or loosely provisioned or, because the service is provided "as is for free," there is nothing to charge for, no contracted service, and no costs to recover. Further, it is often conventional in the consumer internet context that there may be no guarantee of availability or performance and, as a corollary, no ability to claim a service discount if service level targets of a consumer are not met.

Figure 14:
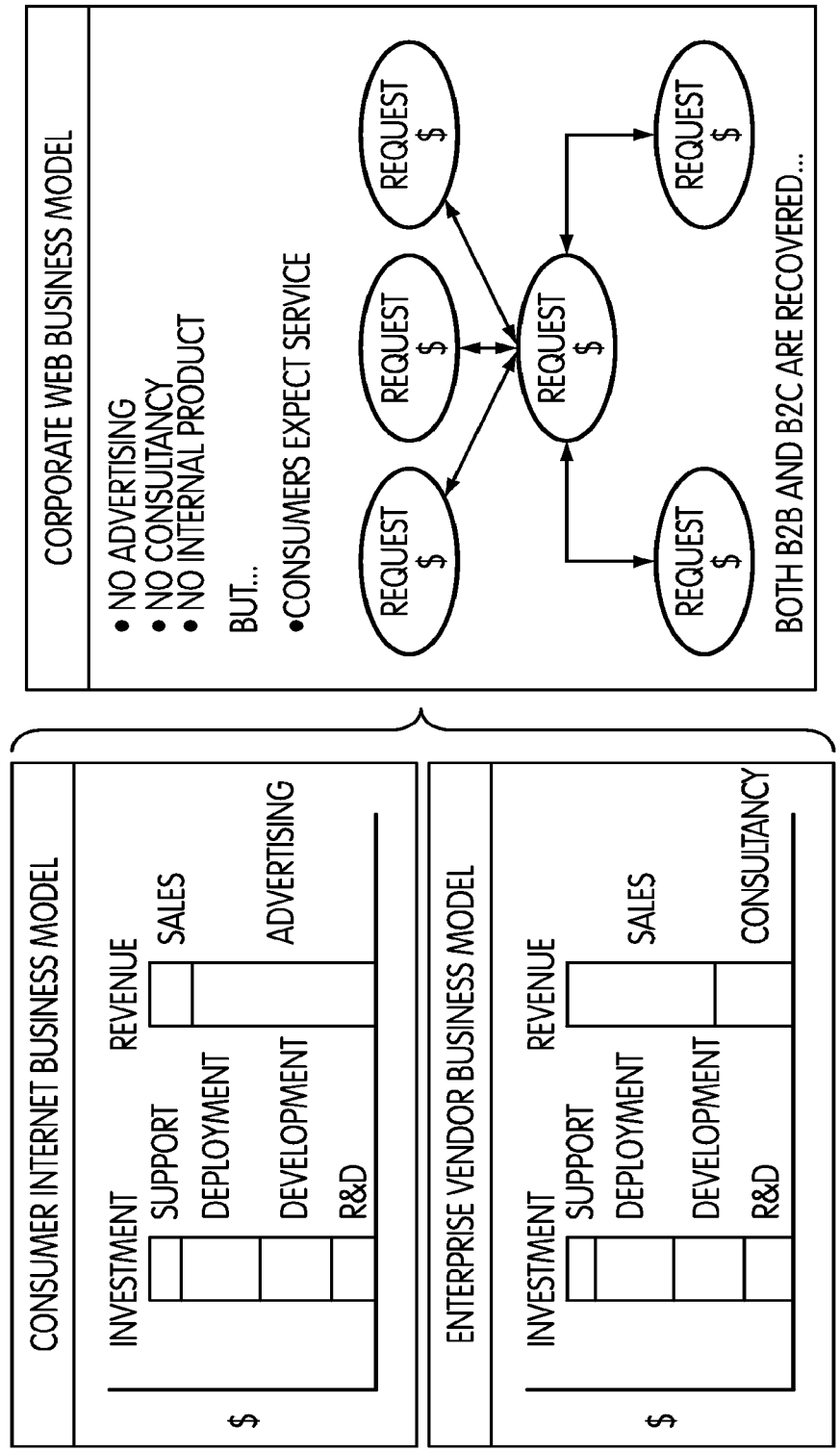
FIG. 14 is a block diagram illustrating business models that may be employed for web services in various contexts.

In many instances, the "as is for free" model is only possible because the use of the service itself is not the primary revenue stream. The revenue stream is more likely derived from a different source such as online advertising or product merchandising. Enterprises, on the other hand, may need to recover the cost of providing technology services to the revenue generating functions of the business. FIG. 14 illustrates some of different business models, such as consumer internet and enterprise vendor business models (left), and an enterprise web service model (right).

An enterprise may be organized as one or more different profit centers which consume services provided by central functions to execute the business of the profit center. One example of a central function or service provider is information technology. It is conventional in the enterprise context for profit centers to have SLA's with one or more central functions to ensure minimum service levels and as a means of allocating service costs to the profit centers. In some instances, the profit center can select one or more services in a service catalog and the central function will provide the profit center with an invoice for using the selected services. Because many enterprises may recover costs on a fully allocated model, central functions may charge on a cost neutral basis, such that the central function cannot make a profit.

Figure 17:
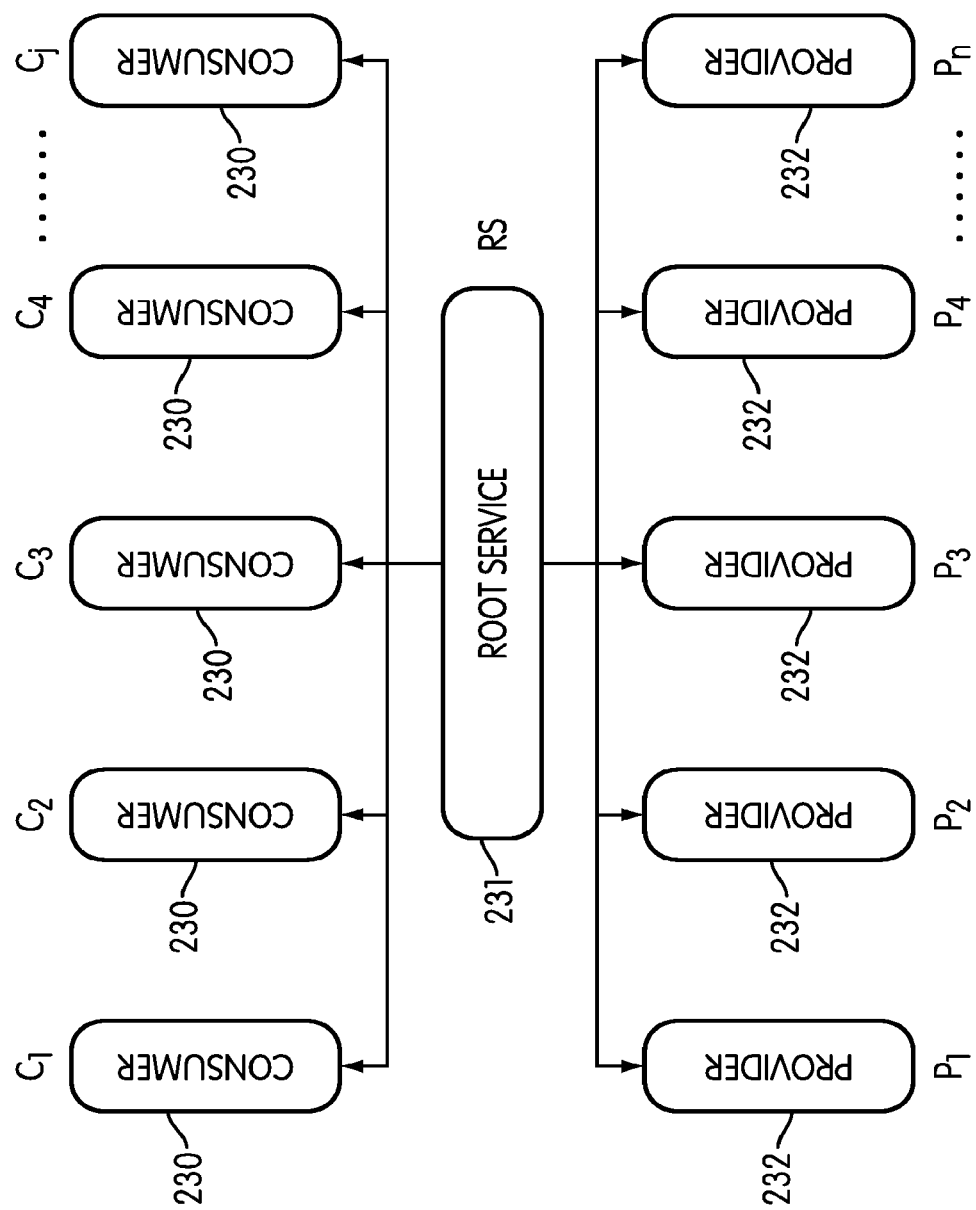
FIG. 17 is a block diagram illustrating an exemplary relationship between consumers of a root web service, data providers to a root web service, and a root web service in accordance with various embodiments of the invention.

Conventionally, organizational, functional, and service boundaries may be fully aligned, making the production of a service catalog a relatively simple exercise in many cases. In some embodiments of the invention, the data sources utilized by the central function may be federated, which may increase the complexity of producing a service catalog. For example, as illustrated in FIG. 17, an undetermined number of customers 230 may use the web service 231. Furthermore, the web service may query an undetermined number of data providers 232. When a customer 230 submits a query to the web service 231, a cost may be incurred for usage of the web service 231 as well as one or more data providers 232. Thus, the total cost of a request may be calculated, as the sum of the cost for usage of the web service 231 and the costs for usage for each of the one or more data providers 232 queried by the request, as illustrated by the equation below:

$$C(r) = \sum_{r} \left( RS_r + \sum_{n} P_n \right),$$

wherein $RS_r$ is the cost of the root service to process and broker the request r and $$\sum_{n} P_n$$

is the cost per provider n included in the request to complete request r.

If the SLA is bound to a request where no request time limit is specified, the SLA may be defined as the lesser of (1) the SLA of the root service to receive, request, and compile responses and (2) the lesser of each of the operating level agreements (OLA's) with each of the service providers, as illustrated by the equation below:

$$SLA(r) = Min(SLA_{RS}, Min(OLA(P_n))),$$

wherein $SLA_{RS}$ is the SLA of the root service to receive, request and compile responses and $OLA(P_n)$ is the OLA between the root service and a provider included in the request.

In some embodiments of the invention, if a time limit for a request is specified by the request or the requestor, the time limit may become the SLA. However, if a specified time limit is the SLA and the specified time is shorter than the best SLA provided between the root service and the requested data providers, the SLA may never be met. Various embodiments of the invention may reset the SLA to that of the root service plus the best SLA of the requested data providers if the specified SLA is shorter than the optimal performance the root service is capable of providing. In some embodiments of the invention, both the request context and service data may contribute to the measurement and reporting of service cost and SLA compliance.

An enterprise may need to recover the cost of providing technology services to the revenue generating functions of the business. In many enterprise contexts, the services provided may not be permitted to be profit centers and therefore may be fully allocated. In basic terms, the sum of the investments required to provide the service to a defined SLA may be recovered from the customers of the service. To achieve the goal of recovering costs from the customers of the service, various embodiments of the invention may apply several general rules. For example, in some embodiments, it may be assumed that only people, not computers or applications, can spend money and/or consume services, in that even if an application is consuming a service, it is doing so at the instruction of a person. Further, in some embodiments, the service may be cost neutral within the enterprise's accounting periods, meaning that costs may not be carried over to the next year unless it is an explicit line item on the profit and loss statement and the accounting rules which govern the fine's behavior permit the costs to be a line item on such statements. A further exemplary rule that the root service may employ is that the consumer may only be charged for the things that the consumer directly consumes, which may include services listed in a service catalog.

Various embodiments of the invention may utilize a cost recovery model for a service containing one or more the following components: an inventory of the service components; an inventory of the service consumers; a service catalog of consumable items; a cost neutral financial calculation; and a means of reporting consumed services in financial terms to customers. For example, as illustrated in FIG. 15 at step 200, it may be desirable to identify current data providers to the root service.

However, the foregoing principles are only examples of one embodiment of the current invention for providing cost neutral financial management of federated web data services. It should be recognized that the current invention anticipates that the specific business model employed by an enterprise may dictate application of the foregoing principles in a manner appropriate for cost recovery in those circumstances.

Conventionally, in a mature service managed environment, SLA's and service cost recovery may be tightly joined. In some instances, the customer and service provider may agree to discounts if the service does not perform to agreed levels. In other instances, if the service provider may specify a utilization baseline which, if exceeded, may trigger agreed incremental investment in capacity or performance.

SLA's may exist between service providers and their customers. OLA's may exist between service providers, as illustrated, for example, in step 203 of FIG. 15. In some embodiments, a SLA may exist between the root service and its consumers and one OLA may exist between each data provider and the root service. Conventionally, such agreements may define a number of meaningful key performance indicators (KPI's), which in turn may require the collection and analysis of a number of metrics from the services in question. In some embodiments, both the request context and service data may contribute. Various embodiments of the invention may confirm the identity of the consumer using the request context and may provide the data metrics to be reported, both for service consumption and service performance using service data. In some embodiments, before costs and SLA can be calculated, the service catalog may be defined.

Various embodiments of the invention may collect a broad set of parameters which may represent a combination of the parameters exposed in the request context, the logging made by the root service and/or the web server logs from the web server hosting the root service interface, as illustrated in step 205 of FIG. 15. In some embodiments, some of the parameters may be conventionally available in existing web service products. In some embodiments, some of the parameters may be derived and/or specifically engineered into the design. Various embodiments of the invention may employ two groups of parameters: parameters related to transactions between the requestor and root service; and parameters related to transactions between the root service and other data providers.

Various embodiments of the invention may employ parameters to perform service metering. Conventionally, certain service metrics between a root service and a requestor are available. For example, conventional service metrics in the HTTP header sent with the query may include the authorized user, the local host address, the local host name, the logon user, the remote host address, and the remote host name. However, in some embodiments, the invention may derive certain service management metrics between a root service and a requestor to perform service metering. For example, in some embodiments, the invention may derive one or more of the following service management metrics:

TABLE 10

Exemplary Derived Service Metrics Between a Root Service and Requestor.

| Derived Metric | Description |
| --- | --- |
| Response Identifier | A GUID that uniquely identifies the request made. |
| Query | A string representation of the query sent to the server. |
| Data Providers | A list of data providers which the requestor asked to be included in the federated response. |
| Transport Protocol | The transport protocol used to send the query. |
| Proxy Used | A variable indicating whether the request was received by a proxy prior to the server receiving the request. |
| Requestor Identifier | A GUID that uniquely identifies the requestor. |
| Request Time Stamp | The UTC time and date at which the request was received by the server. |
| Response Time Stamp | The UTC time and date at which the response was processed and sent to the requestor. |
| Unexpired Cache | A variable indicating whether the response was served from an unexpired cache. |
| Populated Response Cache | A variable indicating whether the request was used to populate an entry in the server's response cache. |
| Response Size | An indication of the size of the response sent to the requestor, which may include the content length for the XML load and may exclude the HTTP header and which may be measured in bytes. |
| Throughput | The amount of time taken by the root service to serve the request, which may be measured in milliseconds. |

In some embodiments, the invention may derive service management metrics between the root service and a data provider which may be utilized in some embodiments. For example, in some embodiments, the invention may derive one or more of the following service management metrics between the root service and a data provider:

TABLE 11

Exemplary Derived Service Metrics Between a Root Service and Data Provider.

| Derived Metric | Description |
| --- | --- |
| Response Identifier | A foreign key to the request context. |

TABLE 11-continued

Exemplary Derived Service Metrics Between a Root Service and Data Provider.

| Derived Metric | Description |
| --- | --- |
| Namespace | The namespace of the data provider for whom the metrics are being calculated. |
| OLA Met | A variable indicating whether the data provider responded to the request within an allotted time. |
| Request Time Stamp | The UTC time and date at which the request was received by the data provider. |
| Response Time Stamp | The UTC time and date at which the response was processed and sent to the root service by the data provider. |
| Requestor Identifier | A GUID that uniquely identifies the requestor. |
| Content Length | The size of the response generated by the data provider and sent to the root service, which may include the content length for the XML load and may exclude the HTTP header and which may be measured in bytes. |
| Throughput | The amount of time taken by the data provider to serve the request, which may be measured in milliseconds. |

In some embodiments of the invention, it may be desirable to determine which of the above parameters represent the most appropriate elements of the service catalog, as illustrated in step 207 of FIG. 15. As illustrated in step 204 of FIG. 15, in some embodiments, identification of such elements may be accomplished by collecting pilot data from a broad number of potential customers. In some embodiments, the identification of such elements may be accomplished by collecting data from the root service over an interval of time or based upon some other factor. In some embodiments, the significance of each parameter over the sample data set may be analyzed. Various embodiments of the invention may employ one or more of the following steps to determine the most significant parameters for cost recovery in the particular application at hand.

Various embodiments may use non-dimensionalized values because comparing actual values may provide little transparency because the scales of the one or more parameters may vary greatly, which in itself may disguise correlation between parameters, as illustrated in step 206 of FIG. 15. Non-dimensional values may remove the problem of scaling hiding any relationships. In some embodiments, correlation of parameters may be accomplished by non-dimensionalizing one or more parameters using each parameter's minimum and maximum values as bounds. In some embodiments, parameters may be identified by determining the correlation of the value of each parameter to that of every other parameter, either in raw numbers or non-dimensionalized values. In some embodiments, the determination of the first and second derivatives of each parameter and their correlation to other parameters may also provide information for choosing the most relevant parameters. In some embodiments, comparing derivatives may provide information about how the rates of change between two or more parameters are related. As illustrated in step 208 of FIG. 15, correlation of the values of each parameter may be accomplished by calculating the probability density of the collected metrics.

In some embodiments, the service metering functionality may be employed with pricing bands, as illustrated in step 215 of FIG. 15. Conventionally, pricing bands may be used to account for variations in system usage and requirements between customers. Various embodiments of the invention may allow the implementer to customize the pricing bands for the service metering based on the particular usage characteristics or requirements of customers, or based upon OLA's with data providers One of skill in the art will recognize that the choice of how to define the service catalog may rest with the implementer of the service and/or the customers of the service.

In some embodiments, costing of a service may be correlated with the investments made in the service to obtain cost-neutrality. Various embodiments of the invention may include one or more of the following components to enable charging for the service: the cost of the root service, the cost of federated data provider calls, and the cost charged to the consumer per request. Investments may be defined as the sum of the costs per period required to host and maintain the service per data provider. The root web service may count as a data provider in this instance. The investments (denoted by I) required to build and maintain the platform may be defined by the following equation:

$$I_{investments} = \sum_{dataprovider} I_{hardware} + I_{software} + I_{people} + I_{facilities}$$

In some embodiments, the cost of a request to the root service may be calculated. Various embodiments of the invention may include one or more of the base cost of providing the root service and the cost per provider requested as components of the cost of a request to the service. In some embodiments, the base cost of the root service may be fixed. In various embodiments, the unit cost per provider may be fixed. Various embodiments of the invention may have variable total cost because the consumer may select one or more data providers, which may differ per request. As discussed above, the cost of a request may be calculated using the following formula:

$$C(r) = \sum_{r} \left( RS_r + \sum_{n} P_n \right),$$

wherein $RS_r$ is the cost of the root service to process and broker the request r and $$\sum_{n} P_n$$

is the cost per provider n included in the request to complete request r. As illustrated in step 201 of FIG. 15, the cost per provider may be calculated by determining the cost per provider, which may be calculated as a function of time, for example annually, or as a function of another variable, such as a cost per request. As illustrated in step 202 of FIG. 15, the cost of the root service to process and broker a request may be calculated as a function of time, for example annually, or as a function of another variable, including, for example, the variable cost of processing an individual request.

Various embodiments of the invention may periodically bill users via invoice for the costs of using the service over a time interval, as illustrated in step 210 of FIG. 15. In some embodiments, the metric intervals may be tailored to intervals which best describe usage by the consumer of the web service, as illustrated in step 209 of FIG. 15. In some embodiments, the total costs to be billed to a customer may be calculated by the following formula:

$$C_{RT}(r, t) = \sum_{t} \sum_{r} \left( RS_r + \sum_{n} P_n \right)$$

In some embodiments, the implementer of the solution may wish to set a unit request cost for each of the root and/or data provider services, as illustrated in steps 211 and 212 of FIG. 15. In some embodiments, the unit cost may account for total calls made and/or total calls made to each provider. In some embodiments, the unit cost may be calculated to reach cost neutrality. To obtain cost neutrality, in various embodiments, OLA's may set forth an expectation that a certain number of calls may be made per provider. Various embodiments of the invention may use past service data as a guide for setting forth an expected number of calls. In some embodiments, the cost per provider may be calculated as follows:

$$C_{PT}(t) = \frac{\sum_{t} P_t}{I_P(t)},$$

wherein $C_{PT}$ is the cost per provider request over time interval t, $$\sum_{t} P_t$$

is the average number of previous requests to provider P over time interval t, and $I_P(t)$ is the total cost of provider service over time t.

In some embodiments, the implementer may decide to charge a base flat fee in addition to the cost per request. As illustrated in step 213 of FIG. 15, various embodiments of the invention may review the actual number of requests against the calculated costs per provider and for the root service itself. In these embodiments, it may be necessary to adjust the cost per the chosen service metric to maintain cost neutrality. In the circumstance where a base flat fee is charged, the cost per time interval may be calculated using the following equation:

$$C_{RT}(r, t) = B(t) + \sum_{t} \sum_{r} \left( RS_r + \sum_{n} P_n \right),$$

wherein B(t) is the flat fee per time interval.

In some embodiments, the cost of the root service may be invoiced to a customer or consumer of the service, as illustrated in step 214 of FIG. 15. Various embodiments of the invention may utilize the costing means determined from a chosen dataset collected from the service to produce a sample invoice for the customer or consumer. In some embodiments, a pilot implementation may be used as the chosen dataset. In various embodiments, costing of the service may be accomplished by means of a selected dataset, wherein the reasons for selection of the dataset may include, but are not limited to, the user or users, a specific time period, size of request, type of request, and/or other factors.

As illustrated in step 216 of FIG. 15, in some embodiments, a service catalog may be produced for the root service, wherein the service catalog may contain pricing information for the root service. As illustrated in steps 217 and 218 of FIG. 15, in some embodiments it may be desirable to review the service catalog with one or more consumers, which may include a pilot group. In some embodiments, if one or more consumers will not agree to the pricing set forth in the service catalog, the service catalog may be recalculated. For example, as illustrated in steps 219, 220, and 221 of FIG. 15, various embodiments of the invention contemplate review and/or identifying other service metrics on which the costing for the root service may be based. In some embodiments, the pricing of the service catalog may be recalculated based upon alternative service metrics and/or other factors.

The service level agreement may be defined as the percent of queries returned within the timeout period set by the requestor. Queries returned with a negative context decision are included in the total. Queries for which no timeout is set may be likewise included and marked as having met SLA because no expectation of return time was set (i.e. the time permitted is effectively infinite).

In some embodiments, the duration of each root service and/or data provider request may be recorded in the service data. If the duration of each root service and/or data provider request is recorded, the percentage of SLA compliance may be easily calculated using the below equation.

$$Q_{SLA}(rootservice) = \left( \frac{\sum_{i} q_i(t_i) \forall t < t_{max} + \sum_{i} q_i(t_i) \forall t_{max} = \infty}{\sum_{i} q_i(t_i)} \right) \times 100$$

wherein $Q_{SLA}$ is the percentage of SLA compliance for the root service and $$\sum_{i} q_i(t_i)$$

is the sum of i queries. Thus, the percentage of SLA compliance is the sum of compliant queries for all queries for which a maximum time was specified and compliant queries for which no maximum time was specified divided by the total number of queries multiplied by one hundred (100).

Figure 16:
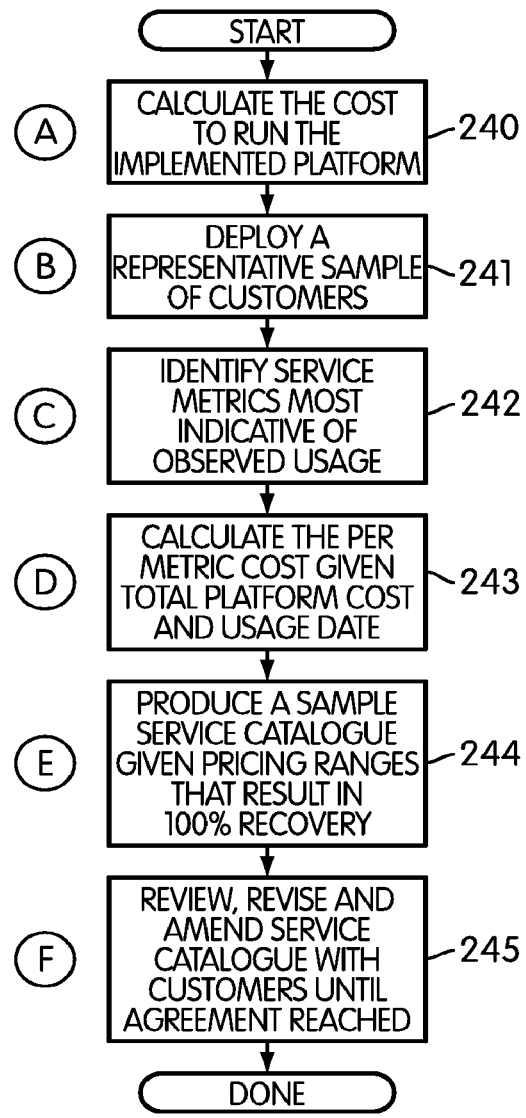
FIG. 16 is a flow diagram of a method for costing a root web service in accordance with various embodiments of the invention.

Various embodiments of the invention may utilize a flow for costing a REST web service as illustrated in FIG. 16 and described above, for example. In some embodiments, the party implementing the web service may calculate the cost to run the implemented platform 200. Various embodiments of the invention may be costed by deploying the web service to customers. In some embodiments, such deployment may be accomplished by means of deploying the web service to a representative sample of customers 241. In some embodiments, the party implementing the web service may identify one or more service metrics, which, in some embodiments, may be most indicative of observed usage 242. Various embodiments of the invention contemplate the use of derived service metrics as the identified one or more service metrics 242. In some embodiments, the service may be costed by calculating the per metric cost given the factors such as the total platform cost and/or usage date 243. According to some embodiments of the invention, the implementing party may produce a sample service catalog which may include pricing ranges that result in recovery of some or all of the cost of the web service or which result in a profit from the web service 244. In some embodiments, the service catalog may be revised based on customer feedback to ensure that proper costing is achieved 245.

In one embodiment, the current invention may be deployed as a web page. In such embodiment, one or more of the following may be desirable for implementation: permission all pages to run security integrated; use a server-side request processor to return data to the client; if XPath is used to filter data on the client side, it may be desirable to use XPath to filter data on the server-side; use document object model (DOM) events to manage the different web service request states; make all initial requests once the first page is loaded; remove namespaces before passing to the client if they are not needed; and/or write all client code cross browser. In some embodiments in which the current invention is deployed as a web page, it may not be desirable to do one or more of the following: run pages anonymously; use a proxy to overcome same domain limitations inside the browser context; process any more content on the client than is needed to render the output; attempt to write multiple web service call responses into the same HTML page at the same time; use custom events if at all possible; load all script libraries and initialize them in the head of the document; and/or explicitly write functions to process XML to a new HTML/XHTML.

In some embodiments, the current invention may be deployed as a desktop application or component. In various embodiments in which the current invention is deployed as a desktop application or component, it may be desirable to use data factories wherever possible to retrieve and store responses asynchronously to rendering. In some embodiments in which the current invention is deployed as a desktop application or component, it may not be desirable to do one or more of the following: render per response row to the client; leave connections open longer than required; and/or create static objects in which returned responses may be stored.

Figure 4:
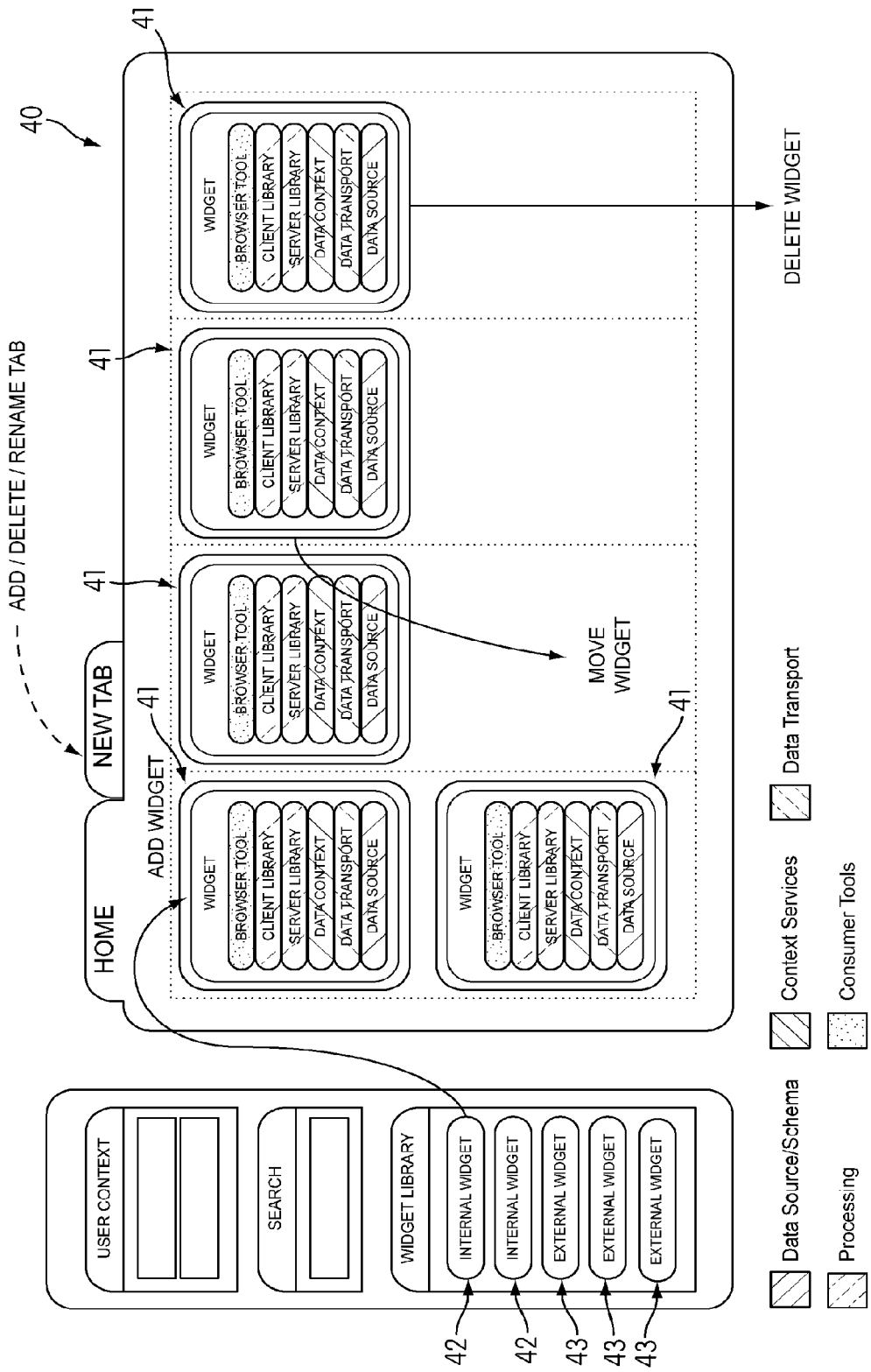
FIG. 4 is a diagram of a graphical user interface usable for providing a web service in accordance with various embodiments of the invention.

Various embodiments of the invention may provide a schema for defining how to combine different data sources, functions supported by the data sources and further data and relationship discovery in a REST interface. In some embodiments, the invention may utilize a GUI 40 as illustrated in FIG. 4. For example, web service GUI 40 may include one or more componentized widgets 41, wherein the componentized widgets 41 may be selected based on a user access control service.

Figure 8:
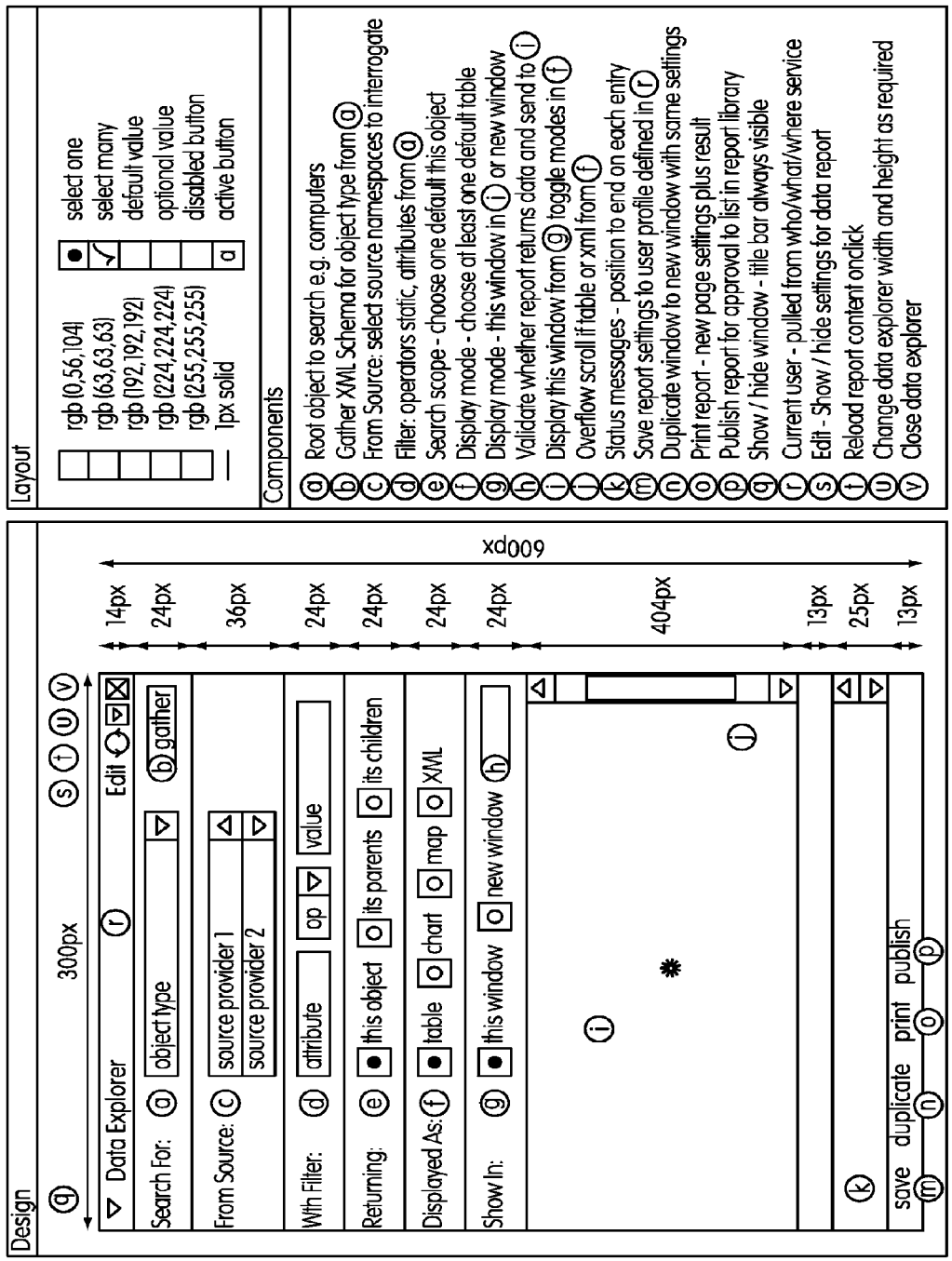
FIG. 8 is a diagram illustrating one embodiment of a graphical user interface to a web service in accordance with various embodiments of the invention.

Various embodiments of the invention may use a GUI as illustrated in FIG. 8 to access data. Whilst the invention may be cross platform and presentation layer independent, some visualization of how the web service, schemas and presentation may be linked together into a sample application. FIG. 8 illustrates a web based widget that has been presented to the requestor for consumption. In some embodiments, the web based widget may be presented to the requestor after the initial user context submission has been successfully completed. FIG. 8 illustrates an exemplary sequence of steps a GUI builder may undertake to utilize each of the schema components, interact with different data providers and provide a rendered result to a client if this was required. As illustrated in FIG. 8, the invention may provide a user with the ability to perform a root object search. A root object search may be performed via a web service. A user may be able to activate a function to gather XML schema for a selected root object. In some embodiments, the invention may provide a user with the ability to select one or more data source namespaces (for example) to interrogate. Various embodiments of the invention may allow the user to filter data returned by the search. Filters may be static operators or values. In some embodiments, the invention may allow the user to return data related to the root object, the root object's parents, and/or the root object's children. The invention may allow the user to select the manner in which data may be displayed, formats including, but not limited to, one or more of tables, charts, maps, and/or XML. Various embodiments of the invention allow the user to validate the search after selecting one or more root objects and/or parameters to bound the search. One of skill in the art will recognize that FIG. 8 represents an illustration of a GUI for accessing a web service according to a schema design that may be employed according to various embodiments of the invention.

Various embodiments of the invention may allow the user to save report settings to a user profile, duplicate a GUI window in a new window with duplicate settings, print a report which may include new page settings and/or results, and/or publish a report for approval to list in a report library. In some embodiments, the invention may support functionality to show or hide the GUI window, show or hide settings for a data report, reload report content in response to user input, change the GUI window width and/or height as required, and/or close the GUI window.

If the content portal is formatted in a framework consistent with ISO and World Wide Web Consortium (W3C) standard technologies, consumers may write portable platform components themselves. In some embodiments, the invention enables consumers to specify the type and scope of content to be displayed, as well as the ability of consumers to contribute content to a web service as described and formatted by the consumer.

Figure 5:
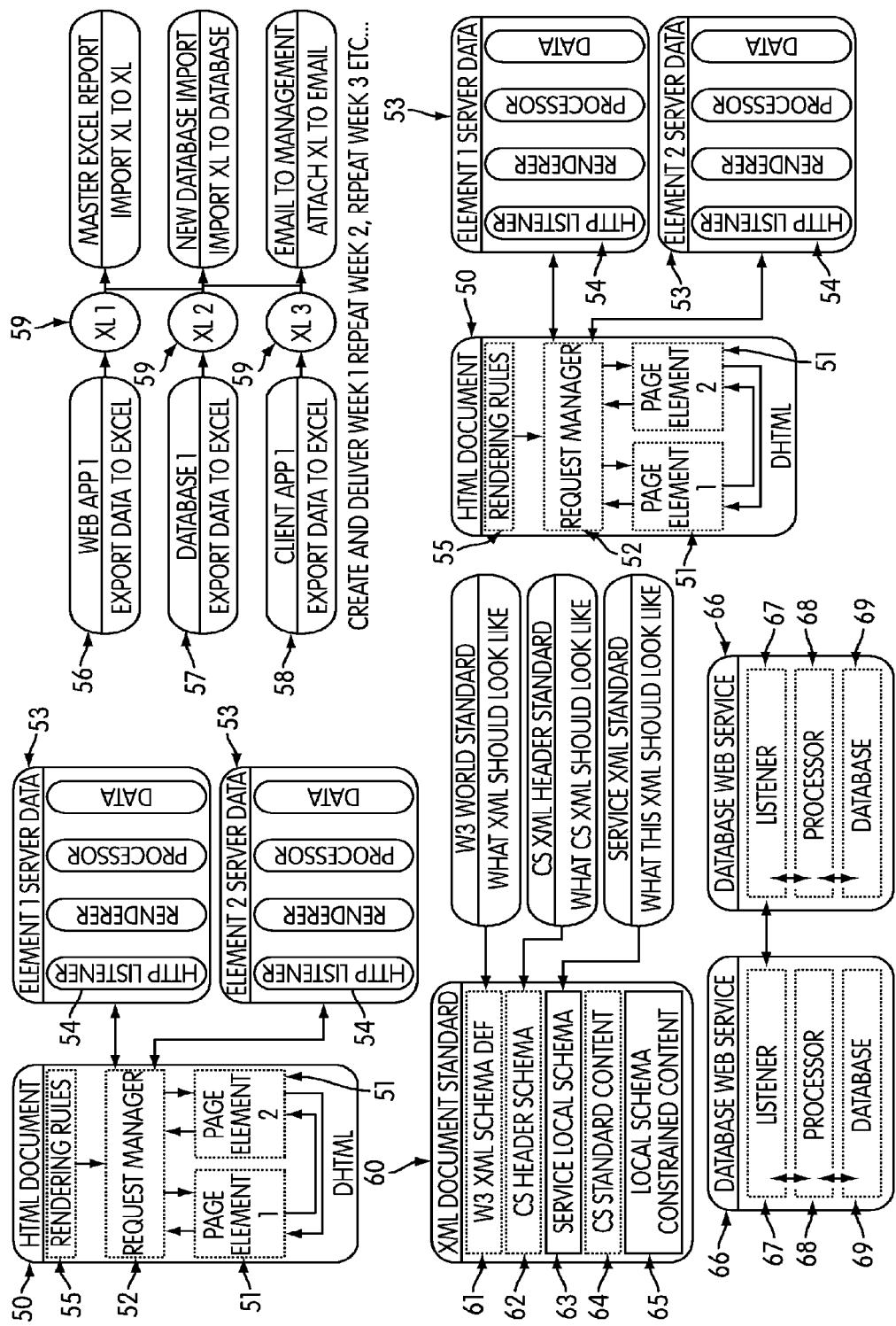
FIGS. 5, 5A, 5B, 5C, 5D, 5E, and 5F are block and flow diagrams of components of a browser stack usable for providing a web service in accordance with various embodiments of the invention.
Figure 5A:
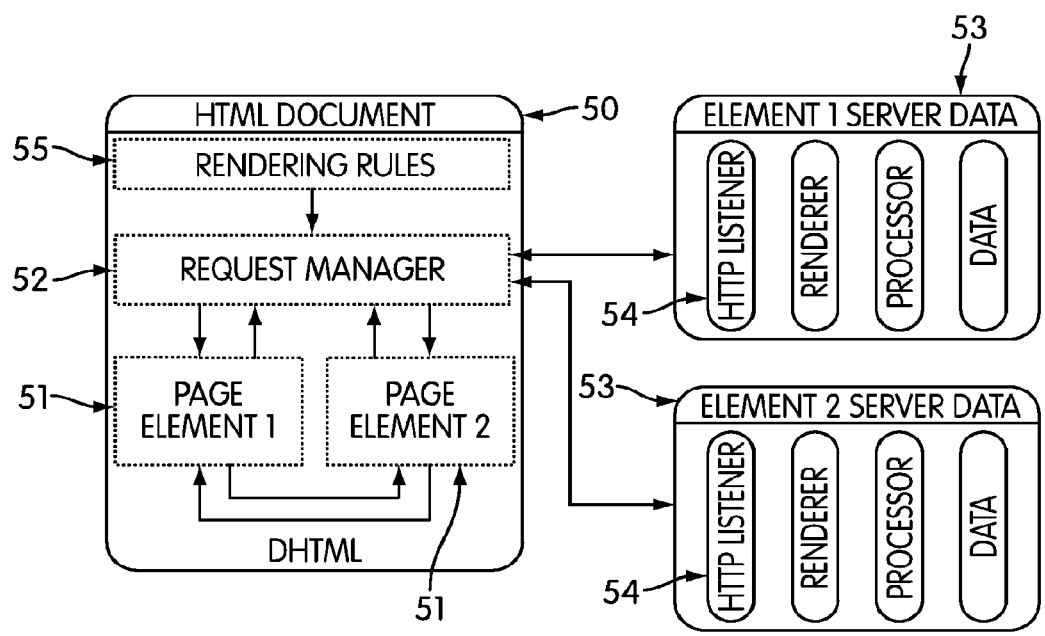
Figure 5B:
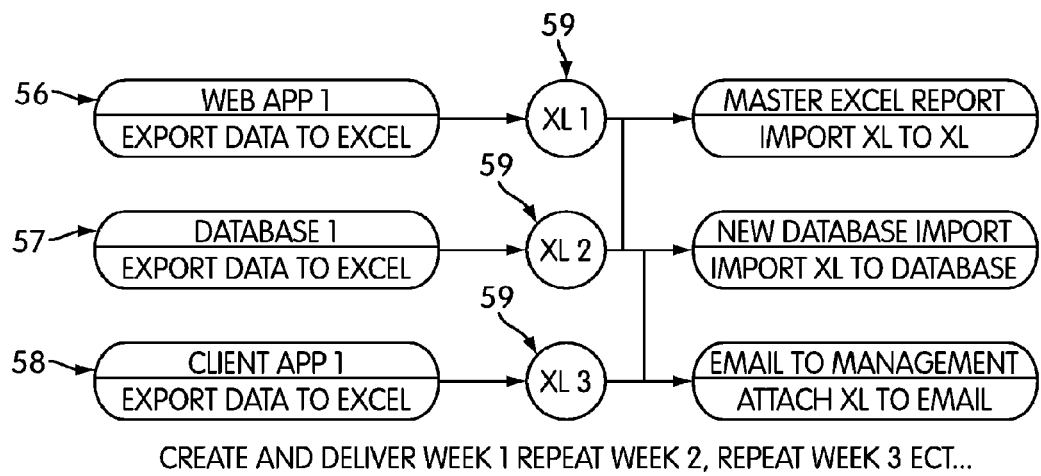
Figure 5C:
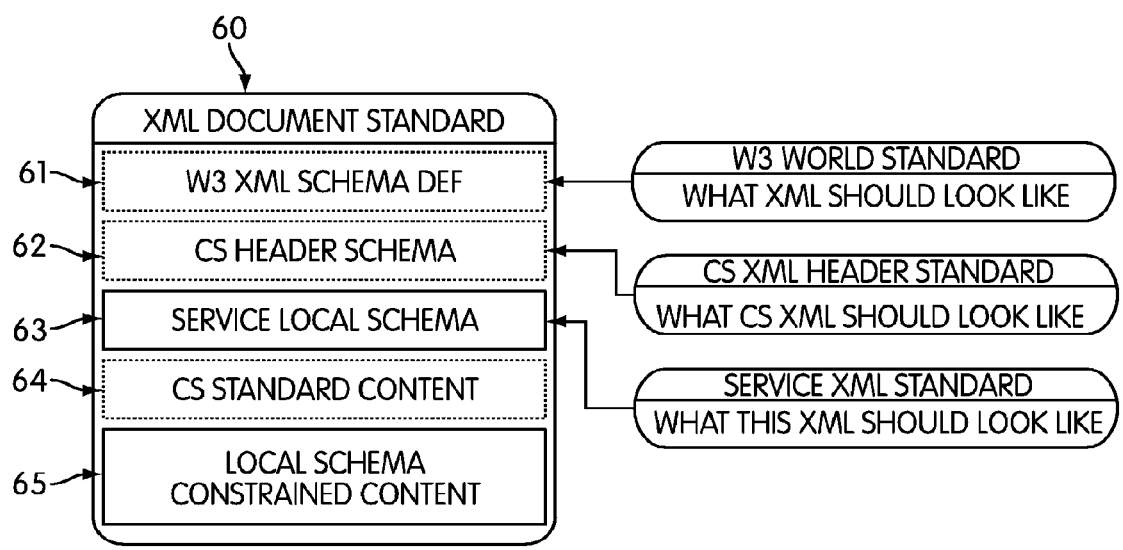
Figure 5D:
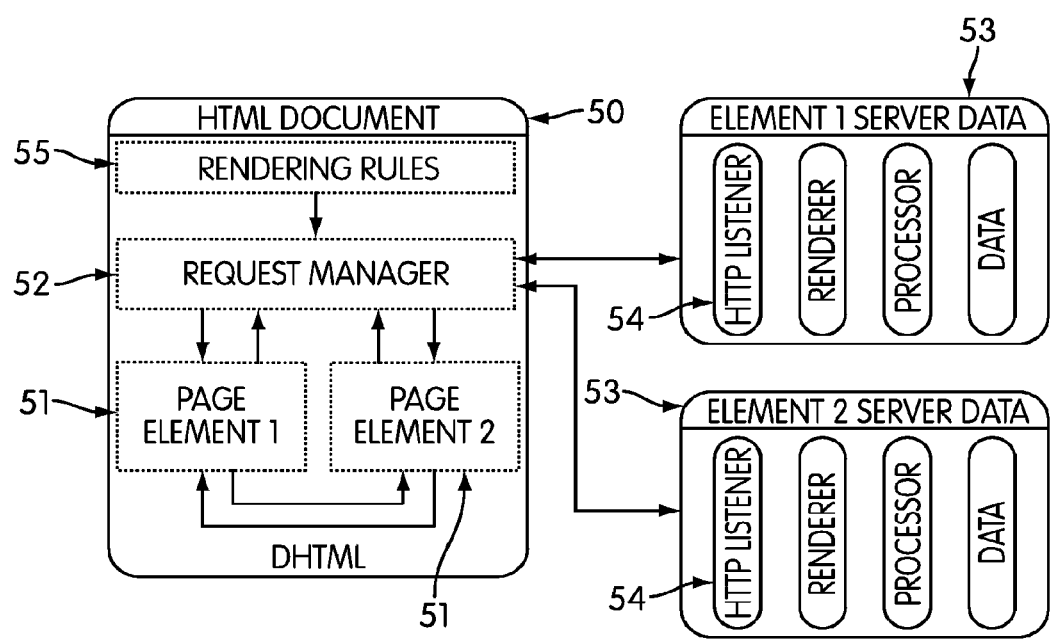

Various embodiments of the invention may use an architecture for a web browser or GUI stack as illustrated in FIGS. 5, 5A, 5B, 5C, 5D, and 5E. The invention may help manage elements illustrated on a web browser interface or GUI interface in the manner illustrated in FIGS. 5A and 5D. In FIGS. 5A and 5D, an HTML document 50 may have one or more page elements 51. If the one or more page elements 51 requests data, a request manager 52 may manage the processing of the request. The request manager 52 may send one or more requests to one or more data sources 53, including one or more servers and/or other data sources. The data sources 53 may employ an HTTP listener 54 to determine if a request has been received. If a request has been received, a data source 53 may process the request, obtain data, serialize the data, and/or transmit a response. Having received a response, the request manager 52 may provide data to the one or more page elements. Elements may be displayed using rendering rules 55 for the HTML document.

In various embodiments, the invention may allow a reduction in duplicate processing, the duplicate processing illustrated in FIG. 5B. FIG. 5B illustrates interaction between one or more applications, programs, and/or web services. The applications, programs, and/or web services may include, but are not limited to, one or more of web services, web applications 56, databases 57, electronic mail, and/or client applications 58. Each of the applications, programs, and/or web services may require data to be exported into a common format 59. Additional processing may be required to import or review the data in the common format. In some embodiments, the invention may be used to access data in one or more formats in one or more data sources and present the data in a format dictated by enterprise or local schema and/or rendering rules.

Various embodiments of the invention may utilize data transmitted between servers in XML or another format. FIG. 5C illustrates an XML document standard 60 that some embodiments of the invention may use. The XML document may include standard World Wide Web (W3) schema definitions 61, which may describe format and/or presentation of data and/or web services in XML. The XML document may further include enterprise specific schema 62, for returning data according to enterprise standards. The XML document may also include service local schema 63, for formatting and/or presenting data according to formatting and/or display standards of the data source. In some embodiments, the XML document may include enterprise standard content 64 and/or local schema constrained content 65.

Figure 5E:
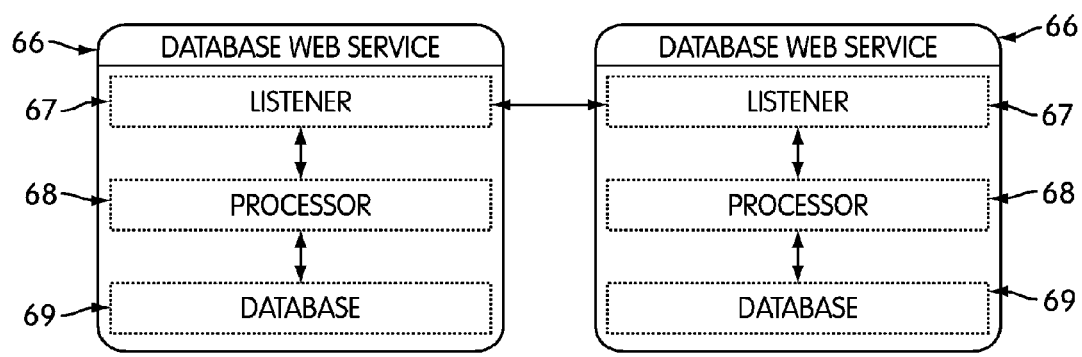

Various embodiments of the invention may utilize data transmission between servers as illustrated in FIG. 5E. In some embodiments, one or more database web services 66 may communicate. When communicating, the one or more database web services 66 may employ a listener 67 for determining if any communications have been received. Communications received by the one or more database web services may be processed by a processor 68. The processor 68 may access data included in a database 69 and process that data for transmission.

Figure 5F:
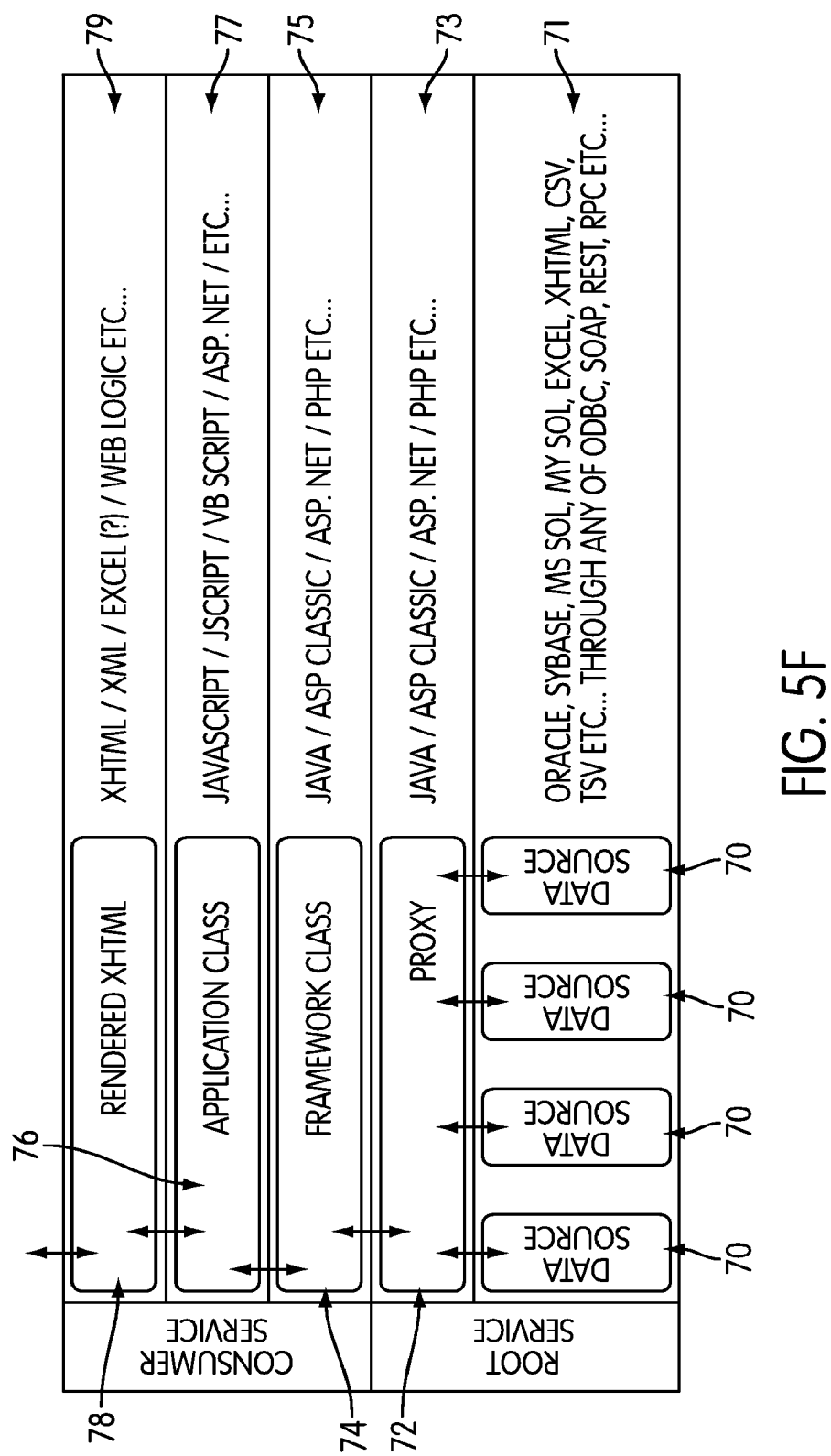

Various embodiments of the invention may use the root service application architecture illustrated in FIG. 5F. In some embodiments, the invention may interface with one or more data sources 70 in one or more source formats 71 by means of a proxy 72. In some embodiments, a framework class 74 may interface with the proxy 72. Data transmitted between the proxy 72 and framework class 74 may be in a number of source formats 73/75, as one of skill in the art will recognize. Various embodiments of the invention may provide for communication between the framework class 74 and an application class 76, wherein the application class 76 may be implemented in a number of programming languages 77. In some embodiments, the application class 76 may provide rendered XHTML 78 or other rendered code in one or more formats 79 for display on a user system.

Figure 6:
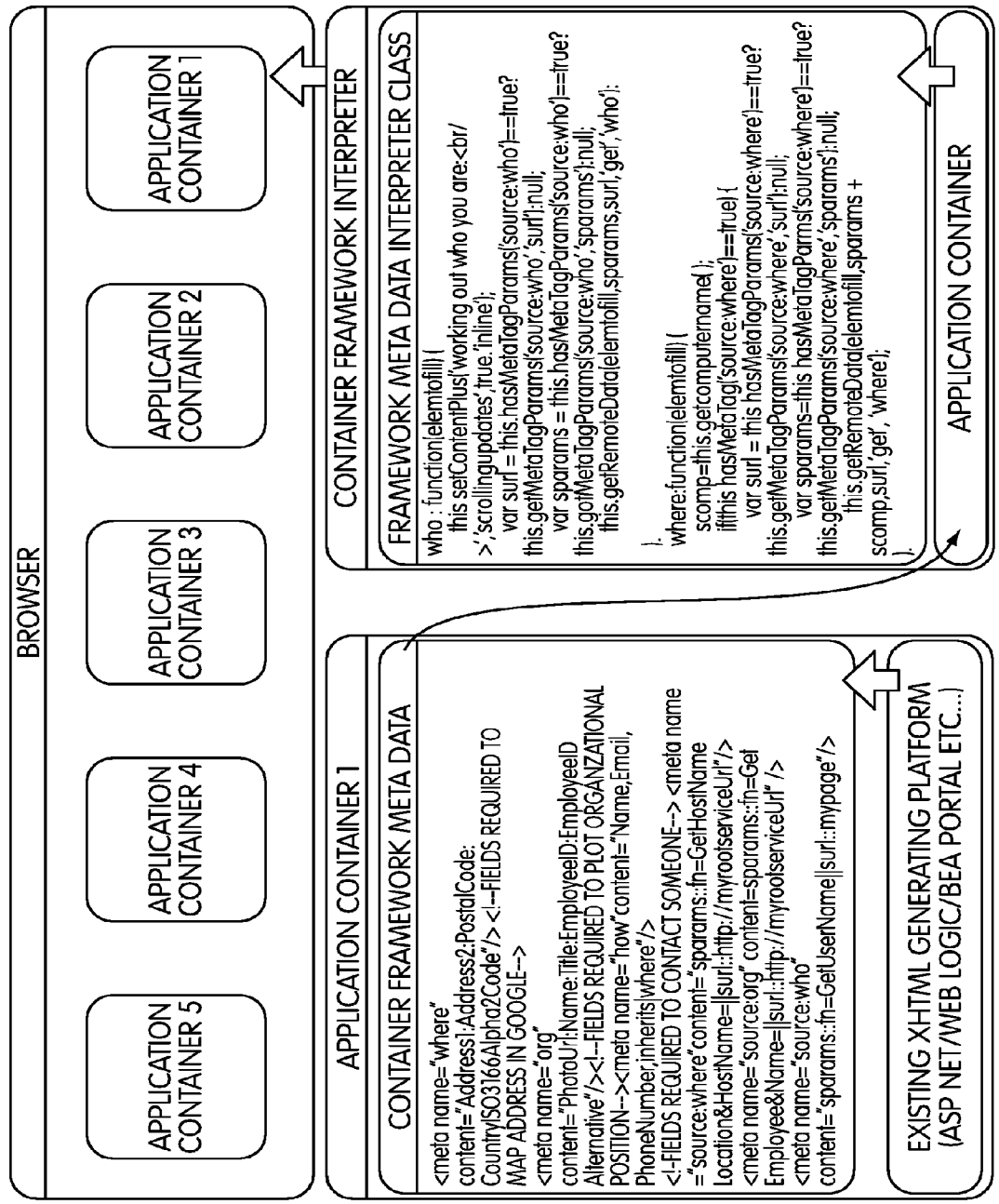
FIG. 6 is a block diagram of processing that may occur when providing a web service in accordance with various embodiments of the invention.
Figure 7:
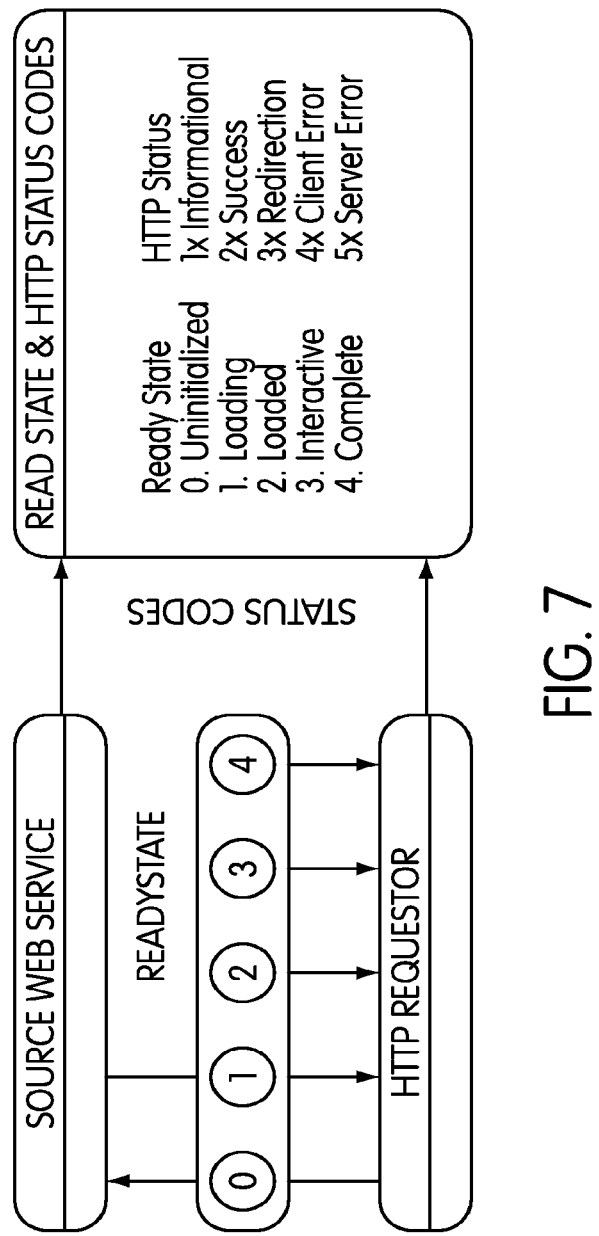
FIG. 7 is a block diagram illustrating service status messages that may be provided by hypertext transfer protocol when providing a web service in accordance with various embodiments of the invention.

In some embodiments, the invention may include the integration of the services which define user context in another application to provide a widget style solution, as illustrated in FIG. 6. The invention may use a standard container framework that may often be used in many portal based web solutions. The invention may extend the standard container framework to make use of class functions which take the data sources provided for all containers to use and then generally consume the data sources in order to determine who the requestor is and where the requestor is located.

Various embodiments of the invention described present a generalized method by which a federated web service could be built and deployed in the enterprise. Variations on the base invention are possible.

Those having skill in the art will appreciate that the invention described herein may work with various system configurations. Accordingly, more or less of the aforementioned system components may be used and/or combined in various embodiments. It should also be understood that various software modules and applications that are utilized to accomplish the functionalities described herein may be maintained on a computing device, which may include one or more of a server, computer, mainframe or other components of root web service 91 and/or aggregating web data service 91, as necessary. In other embodiments, as would be appreciated, the functionalities described herein may be implemented in various combinations of hardware and/or firmware, in addition to, or instead of, software.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for costing a REST web service operable for querying one or more data sources, the method comprising:
    calculating the cost of operating the web service;
    measuring web service usage data using one or more service metrics, wherein the one or more service metrics include at least one derived service metric;
    choosing at least one service metric from the one or more service metrics, wherein one or more of the at least one chosen service metrics is a derived service metric;
    calculating the cost of the web service based on the at least one chosen service metric; and
    charging for usage of the web service based upon the calculated cost of the web service.

2. The method of claim 1, wherein the at least one derived service metric comprises custom data related to the REST web service generated by the REST web service in response to the querying one or more data sources.

3. The method of claim 2, wherein the at least one derived service metric comprises one or more of the set including: a response identifier, a query, a list of one or more data providers, a transport protocol, an indication of whether a proxy is used, a request identifier, a request time stamp, a response time stamp, an indication of whether the request was served from unexpired cache, an indication of whether the response was used to populate a response cache, size of the response, or throughput.

4. The method of claim 1, wherein the at least one derived service metric comprises custom data related to the REST web service and the one or more data sources generated by the REST web service in response to the querying one or more data sources.

5. The method of claim 4, wherein the at least one derived service metric comprises one or more of the set including: a response identifier, a namespace of the queried data source, an indication of whether an operating level agreement has been satisfied, a request time stamp, a response time stamp, a requester identifier, content length, or throughput.

6. The method of claim 1, wherein calculating the cost of the web service based on the at least one chosen service metric comprises dividing the cost of operating the web service by the at least one chosen service metric.

7. The method of claim 6, wherein calculating the cost of operating the web service comprises the steps of:
    determining a cost to the REST web service for all requests to each of the one or more data sources for which web service usage data was measured;
    determining an operating cost of the REST web service for all requests to the REST web service for which web service usage data was measured; and
    determining a total cost for all requests to the REST web service by summing the cost to the REST web service for all requests to each of the one or more data sources and the operating cost the REST web service.

8. The method of claim 7 wherein charging for usage of the web service based upon the calculated cost of the web service further comprises summing the cost of the web service with a flat fee.

* * * * *